(12) United States Patent
He et al.

(10) Patent No.: US 12,118,448 B2
(45) Date of Patent: Oct. 15, 2024

(54) SYSTEM, METHOD, AND COMPUTER PROGRAM PRODUCT FOR MULTI-DOMAIN ENSEMBLE LEARNING BASED ON MULTIVARIATE TIME SEQUENCE DATA

(71) Applicant: Visa International Service Association, San Francisco, CA (US)

(72) Inventors: Linyun He, Austin, TX (US); Shubham Agrawal, Round Rock, TX (US); Yu-San Lin, San Francisco, CA (US); Yuhang Wu, Santa Clara, CA (US); Ishita Bindlish, Bellevue, WA (US); Chiranjeet Chetia, Round Rock, TX (US); Fei Wang, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/268,465

(22) PCT Filed: Oct. 20, 2022

(86) PCT No.: PCT/US2022/047225
§ 371 (c)(1),
(2) Date: Jun. 20, 2023

(87) PCT Pub. No.: WO2023/069584
PCT Pub. Date: Apr. 27, 2023

(65) Prior Publication Data
US 2024/0062120 A1 Feb. 22, 2024

Related U.S. Application Data

(60) Provisional application No. 63/358,317, filed on Jul. 5, 2022, provisional application No. 63/257,737, filed on Oct. 20, 2021.

(51) Int. Cl.
*G06N 20/20* (2019.01)
*G06N 5/04* (2023.01)

(52) U.S. Cl.
CPC ............... *G06N 20/20* (2019.01); *G06N 5/04* (2013.01)

(58) Field of Classification Search
CPC .............................. G06N 20/20; G06N 5/04
See application file for complete search history.

(56) References Cited

U.S. PATENT DOCUMENTS

2011/0307422 A1  12/2011  Drucker et al.
2017/0249434 A1  8/2017  Brunner
(Continued)

FOREIGN PATENT DOCUMENTS

WO  2021167998 A1  8/2021

OTHER PUBLICATIONS

Yin, Xu-Cheng, Kaizhu Huang, and Hong-Wei Hao. "DE2: dynamic ensemble of ensembles for learning nonstationary data." Neurocomputing 165 (2015): 14-22. (Year: 2015).*
(Continued)

*Primary Examiner* — Michael J Huntley
*Assistant Examiner* — Sehwan Kim
(74) *Attorney, Agent, or Firm* — The Webb Law Firm

(57) ABSTRACT

Systems, methods, and computer program products for multi-domain ensemble learning based on multivariate time sequence data are provided. A method may include receiving multivariate sequence data. At least a portion of the multivariate sequence data may be inputted into a plurality of anomaly detection models to generate a plurality of scores. The multivariate sequence data may be combined with the plurality of scores to generate combined intermediate data. The combined intermediate data may be inputted into a combined ensemble model to generate an output score. In
(Continued)

response to determining that the output score satisfies a threshold, at least one of an alert may be communicated to a user device, the multivariate sequence data may be inputted into the feature-domain ensemble model to generate a feature importance vector, or at least one of a model-domain, a time-domain, a feature-domain, or the combined ensemble model may be updated.

20 Claims, 7 Drawing Sheets

(56) References Cited

U.S. PATENT DOCUMENTS

| | | | |
|---|---|---|---|
| 2018/0346151 | A1 | 12/2018 | Sturlaugson et al. |
| 2020/0327456 | A1 | 10/2020 | Sathe et al. |
| 2021/0034994 | A1 | 2/2021 | Stocker et al. |
| 2022/0318684 | A1* | 10/2022 | Allahdadian ............ G06N 3/04 |
| 2022/0366430 | A1* | 11/2022 | Steckel ............... G06Q 30/0185 |
| 2023/0171279 | A1* | 6/2023 | Kels .................... H04L 63/1425 726/22 |

OTHER PUBLICATIONS

Park, Daehyung, Yuuna Hoshi, and Charles C. Kemp. "A multimodal anomaly detector for robot-assisted feeding using an lstm-based variational autoencoder." IEEE Robotics and Automation Letters 3.3 (2018): 1544-1551. (Year: 2018).*

Elwell, Ryan, and Robi Polikar. "Incremental learning of concept drift in nonstationary environments." IEEE Transactions on Neural Networks 22.10 (2011): 1517-1531. (Year: 2011).*

Song, Hui, Alex Kai Qin, and Flora D. Salim. "Evolutionary multi-objective ensemble learning for multivariate electricity consumption prediction." 2018 International Joint Conference on Neural Networks (IJCNN). IEEE, 2018. (Year: 2018).*

Xu, Ke, et al. "Ensemblelens: Ensemble-based visual exploration of anomaly detection algorithms with multidimensional data." IEEE transactions on visualization and computer graphics 25.1 (2018): 109-119. (Year: 2018).*

Adams et al., "Bayesian Online Changepoint Detection," 2007, 7 pages.

Aminikhanghahi et al., "A Survey of Methods for Time Series Change Point Detection," Knowl Information System, 2017, pp. 339-367, 51(2).

Audibert et al., "USAD: UnSupervised Anomaly Detection on Multivariate Time Series," Proceedings of the 26th ACM SIGKDD Conference on Knowledge Discovery and Data Mining, 2020, pp. 3395-3404.

Bai., "Least squares estimation of a shift in linear processes," Massachusetts Institute of Technology, 1993, pp. 453-472.

Brooks et al., "On-the-Fly Massively Multitemporal Change Detection Using Statistical Quality Control Charts and Landsat Data," IEEE Transactions on Geoscience and Remote Sensing, 2014, pp. 3316-3332, vol. 52 (6).

Bullock et al., "Improved change monitoring using an ensemble of time series algorithms," Remote Sensing of Environment, 2020, pp. 1-17. vol. 238.

Chandola et al., "Anomaly Detection: A Survey," ACM Computing Survey, 2009, pp. 1-72. vol. 41, No. 3.

Chandrashekar et al., "A survey on feature selection methods," Computers and Electrical Engineering, 2014, pp. 16-28, vol. 40.

Hundman et al., "Detecting Spacecraft Anomalies Using LSTMs and Nonparametric Dynamic Thresholding," KDD 18, 2018, 9 pages.

Joshi et al., "Multi-Domain Learning: When Do Domains Matter?," 2007, 11 pages.

Kawahara et al., "Change-Point Detection in Time-Series Data by Direct Density-Ratio Estimation," Proceedings of the SIAM International Conference on Data Mining, SDM 2009, 2009, pp. 389-400.

Khatri et al., "Solutions to some Functional Equations and their Applications to Characterization of Probability Distributions," Sankhy a: the Indian journal of statistics, 1968, pp. 167-180.

Mahalanobis et al., "On the Generalized Distance in Statistics," Proceedings of the National Institute of Science of India, 1938, pp. 49-55, vol. 2(1).

Page, "Continuous Inspection Schemes," Biometrika 41, 1954, pp. 100-115.

Page, "A test for a change in a parameter occurring at an unknown point," Biometrika, 1995, pp. 523-527.

Pang et al., "Toward Deep Supervised Anomaly Detection: Reinforcement Learning from Partially Labeled Anomaly Data," KDD '21, 2021, 11 pages.

Pignatiello et al., "Comparisons of Multivariate CUSUM Charts," Journal of Quality Technology, 1990, pp. 173-178. vol. 22, No. 3.

Polikar, "Chapter 1—Ensemble Learning", Ensemble Machine Learning: Methods and Applications, Zhang et al., editors, 2012, pp. 1-34, Springer Science.

Su et al., "Robust Anomaly Detection for Multivariate Time Series through Stochastic Recurrent Neural Network", The 25th ACM SIGKDD Conference on Knowledge Discovery and Data Mining, 2019.

Sugiyama et al., "Direct importance estimation for covariate shift adaptation," Annals of the Institute of Statistical Mathematics, 2008, pp. 699-746, vol. 60.

Wolpert et al., "No Free Lunch Theorems for Optimization," IEEE Transactions on Evolutionary Computation, 1997, pp. 67-82. vol. 1(1).

Ku et al., "A Data-driven Preprocessing Scheme on Anomaly Detection in Big Data Applications," IEEE, 2017, pp. 814-819.

Yamanishi et al., "A unifying framework for detecting outliers and change points from non-stationary time series data," Proceedings of the ACM SIGKDD International Conference on Knowledge Discovery and Data Mining, 2002, only abstract.

Zeileis et al., "Testing, Monitoring, and Data Structural Changes in Exchange Rate Regimes", Computation Statistics & Data Analysis, pp. 1696-1706, vol. 54, No. 6.

Zhang et al., "A Deep Neural Network for Unsupervised Anomaly Detection and Diagnosis in Multivariate Time Series Data," The Thirty-Third AAAI Conference on Artificial Intelligence, 2019, pp. 1409-1416, vol. 33.

Zhou et al., "A state of the art survey of data mining-based fraud detection and credit scoring," MATEC Web of Conferences, 2018, pp. 1-15, vol. 189.

* cited by examiner

SYSTEM, METHOD, AND COMPUTER PROGRAM PRODUCT FOR MULTI-DOMAIN ENSEMBLE LEARNING BASED ON MULTIVARIATE TIME SEQUENCE DATA

CROSS-REFERENCE TO RELATED APPLICATIONS

This application is the United States national phase of International Application No. PCT/US2022/047225 filed Oct. 20, 2022, and claims priority to U.S. Provisional Patent Application Nos. 63/257,737, filed on Oct. 20, 2021, and 63/358,317, filed Jul. 5, 2022, the disclosures of which are incorporated by reference herein in their entireties.

BACKGROUND

1. Field

This disclosure relates generally to multi-domain ensemble learning based on multivariate time sequence data and, in non-limiting embodiments or aspects, systems, methods, and computer program products for multi-domain ensemble learning based on multivariate time sequence data.

2. Technical Considerations

There are many different types of models that can be used for anomaly detection. For example, certain models may detect anomalies based on time sequences for one or more variables (e.g., features).

However, for a given input (e.g., of multi-variate time sequence data), the output of different models and/or different types of models may be different. For example, some (types of) models may detect an anomaly based on such input while others do not. Additionally, taking into account (e.g., combining, ensembling, and/or the like) the scores of multiple different models may be difficult. For example, it may be difficult to determine which feature(s) are important to (e.g., significantly contribute to the output of) each model and/or to determine how to balance the scores from each of the models. Moreover, labels may be sparse and/or only available for some of the input data (e.g., only confirmed anomalies may be labeled while the rest of the data is unlabeled), which may result in supervised learning suffering from class imbalance. In addition, when considering anomaly detection scores from multiple models, false positives may be high (e.g., if the data is flagged for an anomaly every time one or a small number of models detects an anomaly), which may waste resources or cause frustration for users (e.g., users whose legitimate activities are flagged as anomalies, investigators who investigate detected anomalies to determine whether they are actual or false positives, etc.).

SUMMARY

Accordingly, it is an object of the present disclosure to provide systems, methods, and computer program products for multi-domain ensemble learning based on multivariate time sequence data that overcome some or all of the deficiencies identified above.

According to non-limiting embodiments or aspects, provided is a computer-implemented method for multi-domain ensemble learning. The method may include receiving multivariate sequence data including a plurality of vectors. Each respective vector of the plurality of vectors may include elements based on a time sequence for a respective variable of a plurality of variables. At least a portion of the multivariate sequence data may be inputted into each respective anomaly detection model of a plurality of anomaly detection models to generate a plurality of scores including a respective score for each respective anomaly detection model. The multivariate sequence data may be combined with the plurality of scores to generate combined intermediate data. The combined intermediate data may be inputted into a combined ensemble model to generate an output score. The combined ensemble model may be based on a model-domain ensemble model, a time-domain ensemble model, and a feature-domain ensemble model. Whether the output score satisfies a threshold may be determined. In response to determining that the output score satisfies the threshold, at least one of an alert may be communicated to a user device, the multivariate sequence data may be inputted into the feature-domain ensemble model to generate a feature importance vector comprising a feature importance score for each variable of the plurality of variables, or parameters of at least one of the combined ensemble model, the model-domain ensemble model, the time-domain ensemble model, or the feature-domain ensemble model may be updated.

In some non-limiting embodiments or aspects, each anomaly detection model of the plurality of anomaly detection models may include at least one of a classifier model or a score generation model.

In some non-limiting embodiments or aspects, each anomaly detection model of the plurality of anomaly detection models may include at least one of a Bayesian model, a Kullback-Leibler importance estimation procedure (KLIEP) model, a ChangeFinder model, or a cumulative sum (CUSUM) model.

In some non-limiting embodiments or aspects, the method may further include determining whether to label or communicate the at least the portion of the multivariate sequence data based on the output score. In response to determining whether to label or communicate the at least the portion of the multivariate sequence data, one of the at least the portion of the multivariate sequence data may be labeled based on the output score or the at least the portion of the multivariate sequence data and the output score may be communicated to the user device.

In some non-limiting embodiments or aspects, updating the parameters of at least one of the ensemble models may include initializing the combined ensemble model. Additionally or alternatively, for every time step less than a maximum time step, a first temporary variable may be determined based on the combined intermediate data and a current time step version of the combined ensemble model; a second temporary variable may be determined based on a ratio of labels to the first temporary variable; the feature-domain ensemble model may be backpropagated based on a transpose of the combined intermediate data and the second temporary variable; and a next time step version of the combined ensemble model may be determined based on backpropagation of the feature-domain ensemble model and the current time step version of the combined ensemble model.

In some non-limiting embodiments or aspects, updating the parameters of at least one of the ensemble models may further include, for every time step less than the maximum time step, determining a third temporary variable based on a first Khatri-Rao product based on a current time step version of the time-domain ensemble model and a current time step version of the feature-domain ensemble model; determining a current time step version of the model-domain ensemble model based on the third temporary variable, the model-domain ensemble model, and a tensor unfolding in mode 0 of the combined ensemble model; determining a fourth temporary variable based on a second Khatri-Rao product based on the current time step version of the model-domain ensemble model and the current time step version of the feature-domain ensemble model; determining an updated current time step version of the time-domain ensemble model based on the fourth temporary variable, the time-domain ensemble model, and a tensor unfolding in mode 1 of the combined ensemble model; determining a fifth temporary variable based on a third Khatri-Rao product based on the current time step version of the model-domain ensemble model and the updated current time step version of the time-domain ensemble model; and determining an updated current time step version of the feature-domain ensemble model based on the fifth temporary variable, the feature-domain ensemble model, and a tensor unfolding in mode 2 of the combined ensemble model.

In some non-limiting embodiments or aspects, a loss function of the combined ensemble model may be based on the model-domain ensemble model, the time-domain ensemble model, and the feature-domain ensemble model.

In some non-limiting embodiments or aspects, the loss function of the combined ensemble model is based on the following equation:

$$L(M, T, F) = \frac{1}{2}|H - MTF|^2 + \frac{\lambda_1}{2}(|M|^2 + |T|^2 + |F|^2) + \frac{\lambda_2}{2}|I - ZF|^2$$

wherein M is the model-domain ensemble model, T is the time-domain ensemble model, F is the feature-domain ensemble model, H is the combined ensemble model, I is the feature importance vector, and Z is the multivariate sequence data.

According to non-limiting embodiments or aspects, provided is a system for multi-domain ensemble learning. The system may include at least one processor and at least one non-transitory computer-readable medium including one or more instructions that, when executed by at least one processor, direct the at least one processor to receive multivariate sequence data including a plurality of vectors. Each respective vector of the plurality of vectors may include elements based on a time sequence for a respective variable of a plurality of variables. At least a portion of the multivariate sequence data may be input into each respective anomaly detection model of a plurality of anomaly detection models to generate a plurality of scores including a respective score for each respective anomaly detection model. The multivariate sequence data may be combined with the plurality of scores to generate combined intermediate data. The combined intermediate data may be input into a combined ensemble model to generate an output score. The combined ensemble model may be based on a model-domain ensemble model, a time-domain ensemble model, and a feature-domain ensemble model. Whether the output score satisfies a threshold may be determined. In response to determining that the output score satisfies the threshold, at least one of: an alert may be communicated to a user device, the multivariate sequence data may be inputted into the feature-domain ensemble model to generate a feature importance vector including a feature importance score for each variable of the plurality of variables, or parameters of at least one of the combined ensemble model, the model-domain ensemble model, the time-domain ensemble model, or the feature-domain ensemble model may be updated.

In some non-limiting embodiments or aspects, each anomaly detection model of the plurality of anomaly detection models includes at least one of a classifier model or a score generation model.

In some non-limiting embodiments or aspects, each anomaly detection model of the plurality of anomaly detection models includes at least one of a Bayesian model, a Kullback-Leibler importance estimation procedure (KLIEP) model, a ChangeFinder model, or a cumulative sum (CUSUM) model.

In some non-limiting embodiments or aspects, the one or more instructions may further direct the at least one processor to determine whether to label or communicate the at least the portion of the multivariate sequence data based on the output score. In response to determining whether to label or communicate the at least the portion of the multivariate sequence data, one of the at least the portion of the multivariate sequence data may be labeled based on the output score or the at least the portion of the multivariate sequence data and the output score may be communicated to the user device.

In some non-limiting embodiments or aspects, when updating the parameters of at least one of the combined ensemble model, the model-domain ensemble model, the time-domain ensemble model, or the feature-domain ensemble model, the one or more instructions may further direct the at least one processor to initialize the combined ensemble model. For every time step less than a maximum time step, a first temporary variable may be determined based on the combined intermediate data and a current time step version of the combined ensemble model, a second temporary variable may be determined based on a ratio of labels to the first temporary variable, the feature-domain ensemble model may be backpropagated based on a transpose of the combined intermediate data and the second temporary variable, and a next time step version of the combined ensemble model may be determined based on backpropagation of the feature-domain ensemble model and the current time step version of the combined ensemble model.

In some non-limiting embodiments or aspects, when updating the parameters of at least one of the combined ensemble model, the model-domain ensemble model, the time-domain ensemble model, or the feature-domain ensemble model, the one or more instructions may further direct the at least one processor to, for every time step less than the maximum time step, determine a third temporary variable based on a first Khatri-Rao product based on a current time step version of the time-domain ensemble model and a current time step version of the feature-domain ensemble model; determine a current time step version of the model-domain ensemble model based on the third temporary variable, the model-domain ensemble model, and a tensor unfolding in mode 0 of the combined ensemble model; determine a fourth temporary variable based on a second Khatri-Rao product based on the current time step version of the model-domain ensemble model and the current time step version of the feature-domain ensemble model; determine an updated current time step version of the time-domain ensemble model based on the fourth temporary variable, the time-domain ensemble model, and a tensor unfolding in mode 1 of the combined ensemble model; determine a fifth temporary variable based on a third Khatri-Rao product based on the current time step version of the model-domain ensemble model and the updated current time step version of the time-domain ensemble model; and determine an updated current time step version of the feature-domain ensemble model based on the fifth temporary variable, the feature-domain ensemble model, and a tensor unfolding in mode 2 of the combined ensemble model.

In some non-limiting embodiments or aspects, a loss function of the combined ensemble model may be based on the model-domain ensemble model, the time-domain ensemble model, and the feature-domain ensemble model.

In some non-limiting embodiments or aspects, the loss function of the combined ensemble model may be based on the following equation:

$$L(M, T, F) = \frac{1}{2}|H - MTF|^2 + \frac{\lambda_1}{2}(|M|^2 + |T|^2 + |F|^2) + \frac{\lambda_2}{2}|I - ZF|^2$$

wherein M is the model-domain ensemble model, T is the time-domain ensemble model, F is the feature-domain ensemble model, H is the combined ensemble model, I is the feature importance vector, and Z is the multivariate sequence data.

According to non-limiting embodiments or aspects, provided is a computer program product for multi-domain ensemble learning. The computer program product may include at least one non-transitory computer-readable medium including one or more instructions that, when executed by at least one processor, cause the at least one processor to receive multivariate sequence data including a plurality of vectors. Each respective vector of the plurality of vectors may include elements based on a time sequence for a respective variable of a plurality of variables. At least a portion of the multivariate sequence data may be input into each respective anomaly detection model of a plurality of anomaly detection models to generate a plurality of scores including a respective score for each respective anomaly detection model. The multivariate sequence data may be combined with the plurality of scores to generate combined intermediate data. The combined intermediate data may be input into a combined ensemble model to generate an output score. The combined ensemble model may be based on a model-domain ensemble model, a time-domain ensemble model, and a feature-domain ensemble model. Whether the output score satisfies a threshold may be determined. In response to determining that the output score satisfies the threshold, at least one of: an alert may be communicated to a user device, the multivariate sequence data may be inputted into the feature-domain ensemble model to generate a feature importance vector including a feature importance score for each variable of the plurality of variables, or parameters of at least one of the combined ensemble model, the model-domain ensemble model, the time-domain ensemble model, or the feature-domain ensemble model may be updated.

In some non-limiting embodiments or aspects, each anomaly detection model of the plurality of anomaly detection models includes at least one of a classifier model or a score generation model.

In some non-limiting embodiments or aspects, each anomaly detection model of the plurality of anomaly detection models includes at least one of a Bayesian model, a Kullback-Leibler importance estimation procedure (KLIEP) model, a ChangeFinder model, or a cumulative sum (CUSUM) model.

In some non-limiting embodiments or aspects, the one or more instructions may further cause the at least one processor to determine whether to label or communicate the at least the portion of the multivariate sequence data based on the output score. In response to determining whether to label or communicate the at least the portion of the multivariate sequence data, one of the at least the portion of the multivariate sequence data may be labeled based on the output score or the at least the portion of the multivariate sequence data and the output score may be communicated to the user device.

In some non-limiting embodiments or aspects, when updating the parameters of at least one of the combined ensemble model, the model-domain ensemble model, the time-domain ensemble model, or the feature-domain ensemble model, the one or more instructions may further cause the at least one processor to initialize the combined ensemble model. For every time step less than a maximum time step, a first temporary variable may be determined based on the combined intermediate data and a current time step version of the combined ensemble model, a second temporary variable may be determined based on a ratio of labels to the first temporary variable, the feature-domain ensemble model may be backpropagated based on a transpose of the combined intermediate data and the second temporary variable, and a next time step version of the combined ensemble model may be determined based on backpropagation of the feature-domain ensemble model and the current time step version of the combined ensemble model.

In some non-limiting embodiments or aspects, when updating the parameters of at least one of the combined ensemble model, the model-domain ensemble model, the time-domain ensemble model, or the feature-domain ensemble model, the one or more instructions may further cause the at least one processor to, for every time step less than the maximum time step, determine a third temporary variable based on a first Khatri-Rao product based on a current time step version of the time-domain ensemble model and a current time step version of the feature-domain ensemble model; determine a current time step version of the model-domain ensemble model based on the third temporary variable, the model-domain ensemble model, and a tensor unfolding in mode 0 of the combined ensemble model; determine a fourth temporary variable based on a second Khatri-Rao product based on the current time step version of the model-domain ensemble model and the current time step version of the feature-domain ensemble model; determine an updated current time step version of the time-domain ensemble model based on the fourth temporary variable, the time-domain ensemble model, and a tensor unfolding in mode 1 of the combined ensemble model; determine a fifth temporary variable based on a third Khatri-Rao product based on the current time step version of the model-domain ensemble model and the updated current time step version of the time-domain ensemble model; and determine an updated current time step version of the feature-domain ensemble model based on the fifth temporary variable, the feature-domain ensemble model, and a tensor unfolding in mode 2 of the combined ensemble model.

In some non-limiting embodiments or aspects, a loss function of the combined ensemble model may be based on the model-domain ensemble model, the time-domain ensemble model, and the feature-domain ensemble model.

In some non-limiting embodiments or aspects, the loss function of the combined ensemble model may be based on the following equation:

$$L(M, T, F) = \frac{1}{2}|H - MTF|^2 + \frac{\lambda_1}{2}(|M|^2 + |T|^2 + |F|^2) + \frac{\lambda_2}{2}|I - ZF|^2$$

wherein M is the model-domain ensemble model, T is the time-domain ensemble model, F is the feature-domain ensemble model, H is the combined ensemble model, I is the feature importance vector, and Z is the multivariate sequence data.

According to non-limiting embodiments or aspects, provided is a system for multi-domain ensemble learning. The system may include at least one processor; and at least one non-transitory computer-readable medium including one or more instructions that, when executed by the at least one processor, direct the at least one processor to perform any of the methods described herein.

According to non-limiting embodiments or aspects, provided is a computer program product for multi-domain ensemble learning. The computer program product may include at least one non-transitory computer-readable medium including one or more instructions that, when executed by at least one processor, cause the at least one processor to perform any of the methods described herein.

Other non-limiting embodiments or aspects will be set forth in the following numbered clauses:

Clause 1: A computer-implemented method, comprising: receiving, with at least one processor, multivariate sequence data comprising a plurality of vectors, each respective vector of the plurality of vectors comprising elements based on a time sequence for a respective variable of a plurality of variables; inputting, with at least one processor, at least a portion of the multivariate sequence data into each respective anomaly detection model of a plurality of anomaly detection models to generate a plurality of scores comprising a respective score for each respective anomaly detection model; combining, with at least one processor, the multivariate sequence data with the plurality of scores to generate combined intermediate data; inputting, with at least one processor, the combined intermediate data into a combined ensemble model to generate an output score, the combined ensemble model based on a model-domain ensemble model, a time-domain ensemble model, and a feature-domain ensemble model; determining, with at least one processor, that the output score satisfies a threshold; and in response to determining that the output score satisfies the threshold, at least one of: communicating, with at least one processor, an alert to a user device; inputting, with at least one processor, the multivariate sequence data into the feature-domain ensemble model to generate a feature importance vector comprising a feature importance score for each variable of the plurality of variables; or updating, with at least one processor, parameters of at least one of the combined ensemble model, the model-domain ensemble model, the time-domain ensemble model, or the feature-domain ensemble model.

Clause 2: The method of clause 1, wherein each anomaly detection model of the plurality of anomaly detection models comprises at least one of a classifier model or a score generation model.

Clause 3: The method of clause 1 or clause 2, wherein each anomaly detection model of the plurality of anomaly detection models comprises at least one of a Bayesian model, a Kullback-Leibler importance estimation procedure (KLIEP) model, a ChangeFinder model, or a cumulative sum (CUSUM) model.

Clause 4: The method of any of clauses 1-3, further comprising: determining, with at least one processor, whether to label or communicate the at least the portion of the multivariate sequence data based on the output score; and in response to determining whether to label or communicate the at least the portion of the multivariate sequence data, one of: labeling, with at least one processor, the at least the portion of the multivariate sequence data based on the output score; or communicating, with at least one processor, the at least the portion of the multivariate sequence data and the output score to the user device.

Clause 5: The method of any of clauses 1-4, wherein updating the parameters of at least one of the combined ensemble model, the model-domain ensemble model, the time-domain ensemble model, or the feature-domain ensemble model comprises: initializing, with at least one processor, the combined ensemble model; for every time step less than a maximum time step: determining, with at least one processor, a first temporary variable based on the combined intermediate data and a current time step version of the combined ensemble model; determining, with at least one processor, a second temporary variable based on a ratio of labels to the first temporary variable; backpropagating, with at least one processor, the feature-domain ensemble model based on a transpose of the combined intermediate data and the second temporary variable; and determining, with at least one processor, a next time step version of the combined ensemble model based on backpropagation of the feature-domain ensemble model and the current time step version of the combined ensemble model.

Clause 6: The method of any of clauses 1-5, wherein updating the parameters of at least one of the combined ensemble model, the model-domain ensemble model, the time-domain ensemble model, or the feature-domain ensemble model further comprises: for every time step less than the maximum time step: determining, with at least one processor, a third temporary variable based on a first Khatri-Rao product based on a current time step version of the time-domain ensemble model and a current time step version of the feature-domain ensemble model; determining, with at least one processor, a current time step version of the model-domain ensemble model based on the third temporary variable, the model-domain ensemble model, and a tensor unfolding in mode 0 of the combined ensemble model; determining, with at least one processor, a fourth temporary variable based on a second Khatri-Rao product based on the current time step version of the model-domain ensemble model and the current time step version of the feature-domain ensemble model; determining, with at least one processor, an updated current time step version of the time-domain ensemble model based on the fourth temporary variable, the time-domain ensemble model, and a tensor unfolding in mode 1 of the combined ensemble model; determining, with at least one processor, a fifth temporary variable based on a third Khatri-Rao product based on the current time step version of the model-domain ensemble model and the updated current time step version of the time-domain ensemble model; and determining, with at least one processor, an updated current time step version of the feature-domain ensemble model based on the fifth temporary variable, the feature-domain ensemble model, and a tensor unfolding in mode 2 of the combined ensemble model.

Clause 7: The method of any of clauses 1-6, wherein a loss function of the combined ensemble model is based on the model-domain ensemble model, the time-domain ensemble model, and the feature-domain ensemble model.

Clause 8: The method of any of clauses 1-7, wherein the loss function of the combined ensemble model is based on the following equation:

$$L(M, T, F) = \frac{1}{2}|H - MTF|^2 + \frac{\lambda_1}{2}(|M|^2 + |T|^2 + |F|^2) + \frac{\lambda_2}{2}|I - ZF|^2$$

wherein M is the model-domain ensemble model, T is the time-domain ensemble model, F is the feature-domain ensemble model, H is the combined ensemble model, I is the feature importance vector, and Z is the multivariate sequence data.

Clause 9: A system, comprising: at least one processor; and at least one non-transitory computer-readable medium including one or more instructions that, when executed by at least one processor, direct the at least one processor to: receive multivariate sequence data comprising a plurality of vectors, each respective vector of the plurality of vectors comprising elements based on a time sequence for a respective variable of a plurality of variables; input at least a portion of the multivariate sequence data into each respective anomaly detection model of a plurality of anomaly detection models to generate a plurality of scores comprising a respective score for each respective anomaly detection model; combine the multivariate sequence data with the plurality of scores to generate combined intermediate data; input the combined intermediate data into a combined ensemble model to generate an output score, the combined ensemble model based on a model-domain ensemble model, a time-domain ensemble model, and a feature-domain ensemble model; determine that the output score satisfies a threshold; and in response to determining that the output score satisfies the threshold, at least one of: communicate an alert to a user device; input the multivariate sequence data into the feature-domain ensemble model to generate a feature importance vector comprising a feature importance score for each variable of the plurality of variables; or update parameters of at least one of the combined ensemble model, the model-domain ensemble model, the time-domain ensemble model, or the feature-domain ensemble model.

Clause 10: The system of clause 9, wherein each anomaly detection model of the plurality of anomaly detection models comprises at least one of a classifier model or a score generation model.

Clause 11: The system of clause 9 or clause 10, wherein each anomaly detection model of the plurality of anomaly detection models comprises at least one of a Bayesian model, a Kullback-Leibler importance estimation procedure (KLIEP) model, a ChangeFinder model, or a cumulative sum (CUSUM) model.

Clause 12: The system of any of clauses 9-11, wherein the one or more instructions further direct the at least one processor to: determine whether to label or communicate the at least the portion of the multivariate sequence data based on the output score; and in response to determining whether to label or communicate the at least the portion of the multivariate sequence data, one of: label the at least the portion of the multivariate sequence data based on the output score; or communicate the at least the portion of the multivariate sequence data and the output score to the user device.

Clause 13: The system of any of clauses 9-12, wherein, when updating the parameters of at least one of the combined ensemble model, the model-domain ensemble model, the time-domain ensemble model, or the feature-domain ensemble model, the one or more instructions further direct the at least one processor to: initialize the combined ensemble model; for every time step less than a maximum time step: determine a first temporary variable based on the combined intermediate data and a current time step version of the combined ensemble model; determine a second temporary variable based on a ratio of labels to the first temporary variable; backpropagate the feature-domain ensemble model based on a transpose of the combined intermediate data and the second temporary variable; and determine a next time step version of the combined ensemble model based on backpropagation of the feature-domain ensemble model and the current time step version of the combined ensemble model.

Clause 14: The system of any of clauses 9-13, wherein, when updating the parameters of at least one of the combined ensemble model, the model-domain ensemble model, the time-domain ensemble model, or the feature-domain ensemble model, the one or more instructions further direct the at least one processor to: for every time step less than the maximum time step: determine a third temporary variable based on a first Khatri-Rao product based on a current time step version of the time-domain ensemble model and a current time step version of the feature-domain ensemble model; determine a current time step version of the model-domain ensemble model based on the third temporary variable, the model-domain ensemble model, and a tensor unfolding in mode 0 of the combined ensemble model; determine a fourth temporary variable based on a second Khatri-Rao product based on the current time step version of the model-domain ensemble model and the current time step version of the feature-domain ensemble model; determine an updated current time step version of the time-domain ensemble model based on the fourth temporary variable, the time-domain ensemble model, and a tensor unfolding in mode 1 of the combined ensemble model; determine a fifth temporary variable based on a third Khatri-Rao product based on the current time step version of the model-domain ensemble model and the updated current time step version of the time-domain ensemble model; and determine an updated current time step version of the feature-domain ensemble model based on the fifth temporary variable, the feature-domain ensemble model, and a tensor unfolding in mode 2 of the combined ensemble model.

Clause 15: The system of any of clauses 9-14, wherein a loss function of the combined ensemble model is based on the model-domain ensemble model, the time-domain ensemble model, and the feature-domain ensemble model.

Clause 16: The system of any of clauses 9-15, wherein the loss function of the combined ensemble model is based on the following equation:

$$L(M, T, F) = \frac{1}{2}|H - MTF|^2 + \frac{\lambda_1}{2}(|M|^2 + |T|^2 + |F|^2) + \frac{\lambda_2}{2}|I - ZF|^2$$

wherein M is the model-domain ensemble model, T is the time-domain ensemble model, F is the feature-domain ensemble model, H is the combined ensemble model, I is the feature importance vector, and Z is the multivariate sequence data.

Clause 17: A computer program product comprising at least one non-transitory computer-readable medium including one or more instructions that, when executed by at least one processor, cause the at least one processor to: receive multivariate sequence data comprising a plurality of vectors, each respective vector of the plurality of vectors comprising elements based on a time sequence for a respective variable of a plurality of variables; input at least a portion of the multivariate sequence data into each respective anomaly detection model of a plurality of anomaly detection models to generate a plurality of scores comprising a respective score for each respective anomaly detection model; combine the multivariate sequence data with the plurality of scores to generate combined intermediate data; input the combined intermediate data into a combined ensemble model to generate an output score, the combined ensemble model based on a model-domain ensemble model, a time-domain ensemble model, and a feature-domain ensemble model; determine that the output score satisfies a threshold; and in response to determining that the output score satisfies the threshold, at least one of: communicate an alert to a user device; input the multivariate sequence data into the feature-domain ensemble model to generate a feature importance vector comprising a feature importance score for each variable of the plurality of variables; or update parameters of at least one of the combined ensemble model, the model-domain ensemble model, the time-domain ensemble model, or the feature-domain ensemble model.

Clause 18: The computer program product of clause 17, wherein the one or more instructions further cause the at least one processor to: determine whether to label or communicate the at least the portion of the multivariate sequence data based on the output score; and in response to determining whether to label or communicate the at least the portion of the multivariate sequence data, one of: label the at least the portion of the multivariate sequence data based on the output score; or communicate the at least the portion of the multivariate sequence data and the output score to the user device.

Clause 19: The computer program product of clause 17 or clause 18, wherein, when updating the parameters of at least one of the combined ensemble model, the model-domain ensemble model, the time-domain ensemble model, or the feature-domain ensemble model, the one or more instructions further cause the at least one processor to: initialize the combined ensemble model; for every time step less than a maximum time step: determine a first temporary variable based on the combined intermediate data and a current time step version of the combined ensemble model; determine a second temporary variable based on a ratio of labels to the first temporary variable; backpropagate the feature-domain ensemble model based on a transpose of the combined intermediate data and the second temporary variable; and determine a next time step version of the combined ensemble model based on backpropagation of the feature-domain ensemble model and the current time step version of the combined ensemble model.

Clause 20: The computer program product of any of clauses 17-19, wherein, when updating the parameters of at least one of the combined ensemble model, the model-domain ensemble model, the time-domain ensemble model, or the feature-domain ensemble model, the one or more instructions further cause the at least one processor to: for every time step less than the maximum time step: determine a third temporary variable based on a first Khatri-Rao product based on a current time step version of the time-domain ensemble model and a current time step version of the feature-domain ensemble model; determine a current time step version of the model-domain ensemble model based on the third temporary variable, the model-domain ensemble model, and a tensor unfolding in mode 0 of the combined ensemble model; determine a fourth temporary variable based on a second Khatri-Rao product based on the current time step version of the model-domain ensemble model and the current time step version of the feature-domain ensemble model; determine an updated current time step version of the time-domain ensemble model based on the fourth temporary variable, the time-domain ensemble model, and a tensor unfolding in mode 1 of the combined ensemble model; determine a fifth temporary variable based on a third Khatri-Rao product based on the current time step version of the model-domain ensemble model and the updated current time step version of the time-domain ensemble model; and determine an updated current time step version of the feature-domain ensemble model based on the fifth temporary variable, the feature-domain ensemble model, and a tensor unfolding in mode 2 of the combined ensemble model.

Clause 21: A system, comprising: at least one processor; and at least one non-transitory computer-readable medium including one or more instructions that, when executed by the at least one processor, direct the at least one processor to perform the method of any of clauses 1-8.

Clause 22: A computer program product comprising at least one non-transitory computer-readable medium including one or more instructions that, when executed by at least one processor, cause the at least one processor to perform the method of any of clauses 1-8.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which.

DESCRIPTION OF THE PREFERRED EMBODIMENTS

Figure 1:
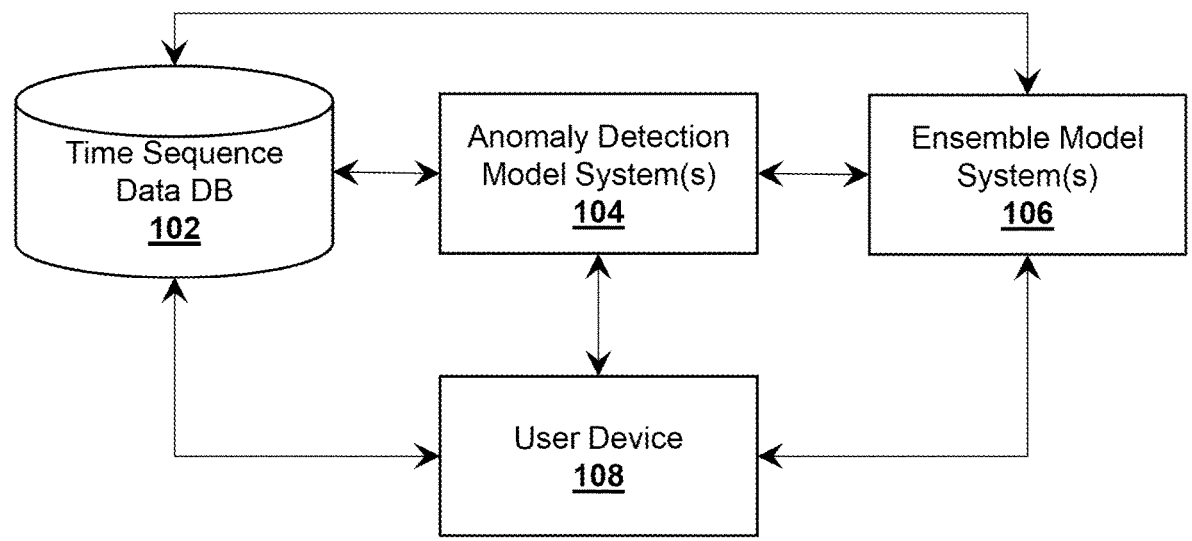
FIG. 1 is a schematic diagram of a system for multi-domain ensemble learning based on multivariate time sequence data, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like. As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Non-limiting embodiments or aspects of the disclosed subject matter are directed to systems, methods, and computer program products for ensemble learning, including, but not limited to, multi-domain ensemble learning based on multivariate time sequence data. For example, non-limiting embodiments or aspects of the disclosed subject matter provide inputting at least a portion of multivariate sequence data into each respective anomaly detection model of a plurality of anomaly detection models to generate a plurality of scores comprising a respective score for each respective anomaly detection model, combining the multivariate sequence data with the scores to generate combined intermediate data, inputting the combined intermediate data into a combined ensemble model (based on a model-domain ensemble model, a time-domain ensemble model, and a feature-domain ensemble model) to generate an output score, and, in response to determining that the output score satisfies a threshold, at least one of communicating an alert, generating a feature importance vector, or updating parameters of at least one of the combined ensemble model, the model-domain ensemble model, the time-domain ensemble model, or the feature-domain ensemble model. Such embodiments or aspects provide techniques and systems that improves anomaly detection by leveraging scores from multiple different models to create a single combined score that is more accurate and less likely to result in false-positives. Additionally, by identifying the feature importance and/or updating the ensemble models, the disclosed techniques and/or systems can actively learn and improve, even if labels (e.g., true expected outputs) are sparse or unavailable.

FIG. 1 depicts an example system 100 for multi-domain ensemble learning based on multivariate time sequence data, according to some non-limiting embodiments or aspects. The system 100 may include time sequence data database 102, anomaly detection model system(s) 104, ensemble model system(s) 106, and/or user device 108.

Time sequence data database 102 may include one or more devices capable of receiving information from and/or communicating information to anomaly detection model system(s) 104, ensemble model system(s) 106, and/or user device 108. For example, time sequence data database 102 may include a computing device, such as a server, a group of servers, and/or other like devices. In some non-limiting embodiments or aspects, time sequence data database 102 may be in communication with a data storage device, which may be local or remote to time sequence data database 102. In some non-limiting embodiments or aspects, time sequence data database 102 may be capable of receiving information from, storing information in, communicating information to, or searching information stored in the data storage device. In some non-limiting embodiments or aspects, time sequence data database 102 may store and/or receive multivariate sequence data comprising a plurality of vectors. For example, each respective vector of the plurality of vectors may include elements based on a time sequence for a respective variable of a plurality of variables Anomaly detection model system(s) 104 may include one or more devices capable of receiving information from and/or communicating information to time sequence data database 102, ensemble model system(s) 106, and/or user device 108. For example, anomaly detection model system(s) 104 may include a computing device, such as a computer, a group of computers, a server, a group of servers, and/or other like devices. In some non-limiting embodiments or aspects, each anomaly detection model system 104 may include at least one anomaly detection model of a plurality of anomaly detection models. For example, each anomaly detection model system 104 may input at least a portion of the multivariate sequence data (from time sequence data database 102) into at least one anomaly detection model to generate at least one score for each respective anomaly detection model.

Ensemble model system(s) 106 may include one or more devices capable of receiving information from and/or communicating information to time sequence data database 102, anomaly detection model system(s) 104, and/or user device 108. For example, ensemble model system(s) 106 may include a computing device, such as a computer, a group of computers, a server, a group of servers, and/or other like devices. In some non-limiting embodiments or aspects, each ensemble model system 106 may include at least one of a combined ensemble model to generate an output score, a model-domain ensemble model, a time-domain ensemble model, and a feature-domain ensemble model, and/or a combined ensemble model (which may be based on the model-domain ensemble model, the time-domain ensemble model, and/or the feature-domain ensemble model). In some non-limiting embodiments or aspects, ensemble model system(s) 106 may combine the multivariate sequence data (from time sequence data database 102) with the plurality of scores (from anomaly detection model system(s) 104) to generate combined intermediate data, as described herein. In some non-limiting embodiments or aspects, ensemble model system(s) 106 may input the combined intermediate data (or the multivariate sequence data and/or the plurality of scores) into the combined ensemble model (or into at least one of the model-domain ensemble model, the time-domain ensemble model, and/or the feature-domain ensemble model) to generate an output score, as described herein. In some non-limiting embodiments or aspects, ensemble model system(s) 106 may determine whether the output score satisfies a threshold, as described herein. In response to that determination, ensemble model system(s) 106 may communicate an alert to a user device 108, inputting the multivariate sequence data into the feature-domain ensemble model to generate a feature importance vector comprising a feature importance score for each variable of the plurality of variables, or update parameters of at least one of the combined ensemble model, the model-domain ensemble model, the time-domain ensemble model, or the feature-domain ensemble model, as described herein.

User device 108 may include one or more devices capable of receiving information from and/or communicating information to time sequence data database 102, anomaly detection model system(s) 104, and/or ensemble model system(s) 106. For example, user device 108 may include a computing device, such as a computer, a mobile device, and/or other like devices. In some non-limiting embodiments or aspects, user device 108 may communicate the multivariate sequence data (e.g., to time sequence data database 102 and/or ensemble model system(s) 106), as described herein. In some non-limiting embodiments or aspects, user device 108 may receive output scores and/or alerts from ensemble model system(s) 106, as described herein.

The number and arrangement of systems and devices shown in FIG. 1 are provided as an example. There may be additional systems and/or devices, fewer systems and/or devices, different systems and/or devices, and/or differently arranged systems and/or devices than those shown in FIG. 1. Furthermore, two or more systems or devices shown in FIG.

1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Figure 2:
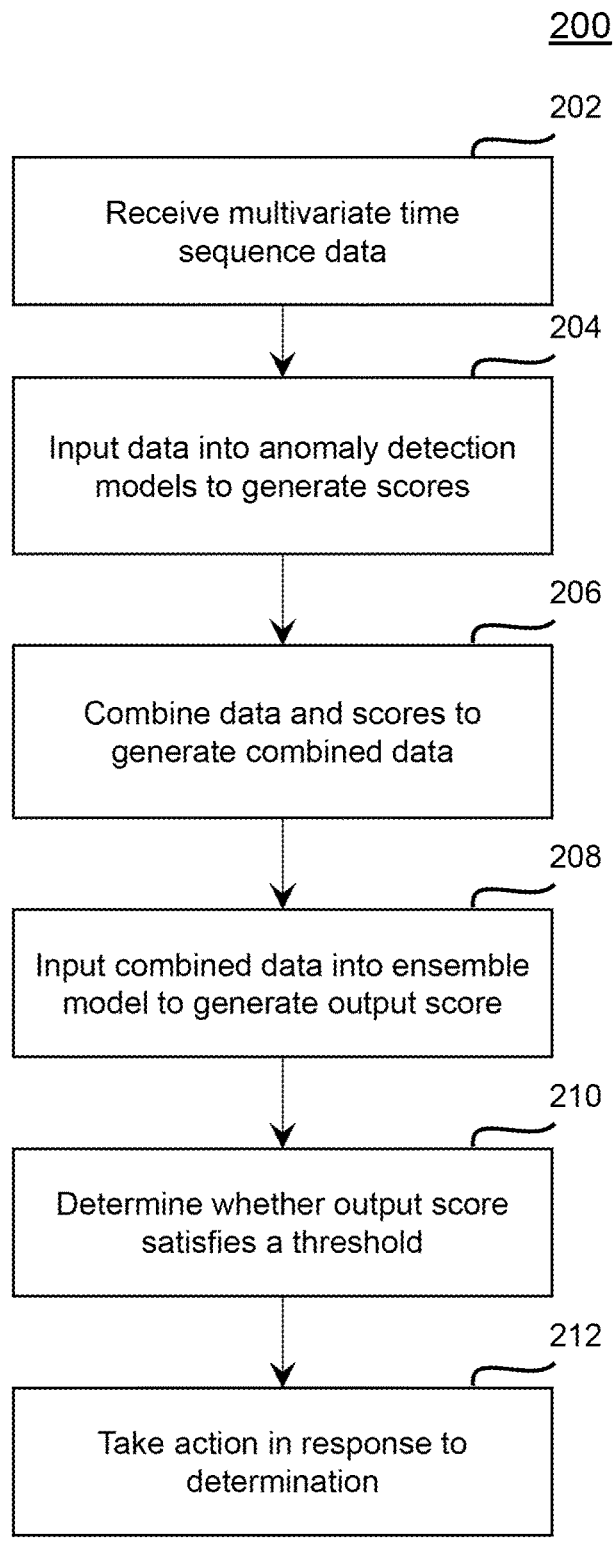
FIG. 2 is a flow diagram for a method for multi-domain ensemble learning based on multivariate time sequence data, according to some non-limiting embodiments or aspects.

Referring now to FIG. 2, shown is an example process 200 for multi-domain ensemble learning based on multivariate time sequence data, according to some non-limiting embodiments or aspects. The steps shown in FIG. 2 are for example purposes only. It will be appreciated that additional, fewer, different, and/or a different order of steps may be used in non-limiting embodiments or aspects. In some non-limiting embodiments or aspects, one or more of the steps of process 200 may be performed (e.g., completely, partially, and/or the like) by ensemble model system(s) 106 (e.g., one or more devices of ensemble model system(s) 106). In some non-limiting embodiments or aspects, one or more of the steps of process 200 may be performed (e.g., completely, partially, and/or the like) by another system, another device, another group of systems, or another group of devices, separate from or including ensemble model system(s) 106, such as time sequence data database 102, anomaly detection model system(s) 104, and/or user device 108.

As shown in FIG. 2, at step 202, process 200 may include receiving multivariate time sequence data. For example, time sequence data database 102, ensemble model system(s) 106, and/or anomaly detection model system(s) 104 may receive multivariate sequence data from user device 108. Additionally or alternatively, time sequence data database 102 may store the multivariate sequence data, and/or anomaly detection model system(s) 104 and/or ensemble model system(s) 106 may receive multivariate sequence data from time sequence data database 102.

In some non-limiting embodiments or aspects, the multivariate sequence data may include a plurality of vectors. For example, each respective vector of the plurality of vectors may include elements based on a time sequence for a respective variable of a plurality of variables.

In some non-limiting embodiments or aspects, the multivariate time sequence data may be time-domain downsampled (e.g., by anomaly detection model system(s) 104 and/or ensemble model system(s) 106). For example, a mask may be applied to the multivariate time sequence data to downsample (e.g., select a subset of time steps, for example, to be used as input, used for training, and/or the like) by following an exponential probability decaying on the time domain. In some non-limiting embodiments or aspects, the length of the mask may be less (e.g., much, much less) than the total number of time steps and/or the current time step. In some non-limiting embodiments or aspects, by using time-domain downsampling, fewer records (e.g., time steps) of the multivariate sequence data may be considered (e.g., used for training), thereby conserving computing resources (e.g., memory), decreasing training time, and improving efficiency, while maintaining or improving performance (e.g., in terms of accuracy, area under the curve (AUC), recall, and/or the like). Table 1 shows accuracy, precision, recall, and AUC for training the models described herein based on the entire multivariate time sequence data set (Original), batch training (Batch), random down-sampling (Downsampling), and time-domain downsampling as described herein (Time-domain sampling), and Table 2 shows the memory usage, training time, and AUC compared to training based on the entire multivariate time sequence data set (Original) of batch training, random downsampling, and time domain downsampling.

TABLE 1

| Approach | Accuracy (%) | Precision (%) | Recall (%) | AUC (%) |
|---|---|---|---|---|
| Original | 96.64 | 40.65 | 48.46 | 73.23 |
| Batch | 92.27 | 20.20 | 61.54 | 77.34 |
| Downsampling | 95.76 | 34.36 | 60.00 | 78.00 |
| Time-domain downsampling | 95.93 | 39.25 | 88.46 | 92.30 |

TABLE 2

| Compared to Original | Memory (%) | Time (%) | AUC (%) |
|---|---|---|---|
| Batch | −83.00 | 23.00 | 5.61 |
| Random Downsampling | −79.83 | −76.00 | 6.51 |
| Time-domain downsampling | −97.97 | −98.26 | 26.04 |

As shown in FIG. 2, at step 204, process 200 may include inputting data into anomaly detection models to generate scores. For example, anomaly detection model system(s) 104 may input at least a portion of the multivariate sequence data into each respective anomaly detection model of a plurality of anomaly detection models to generate a plurality of scores, which may include a respective score for each respective anomaly detection model.

In some non-limiting embodiments or aspects, each anomaly detection model of the plurality of anomaly detection models may include at least one of a classifier model or a score generation model.

In some non-limiting embodiments or aspects, each anomaly detection model of the plurality of anomaly detection models may include at least one of a Bayesian model, a Kullback-Leibler importance estimation procedure (KLIEP) model, a ChangeFinder model, a cumulative sum (CUSUM) model, or any combination thereof.

As shown in FIG. 2, at step 206, process 200 may include combining the data and the scores to generate combined data. For example, anomaly detection model system(s) 104 and/or ensemble model system(s) 106 may combine the multivariate sequence data with the plurality of scores to generate combined intermediate data.

In some non-limiting embodiments or aspects, anomaly detection model system(s) 104 may communicate the combined intermediate data to ensemble model system(s) 106. In some non-limiting embodiments or aspects, anomaly detection model system(s) 104 may communicate the plurality of scores to ensemble model system(s) 106 and/or time sequence data database 102 may communicate the multivariate sequence data to ensemble model system(s) 106. In response to receiving the multivariate sequence data and the plurality of scores, ensemble model system(s) 106 may combine the multivariate sequence data with the plurality of scores to generate combined intermediate data.

As shown in FIG. 2, at step 208, process 200 may include inputting the combined data into at least one ensemble model to generate an output score. For example, ensemble model system(s) 106 may input the combined intermediate data into a combined ensemble model to generate an output score. In some non-limiting embodiments, the combined ensemble model may be based on at least two of (e.g., all three of) a model-domain ensemble model, a time-domain ensemble model, and/or a feature-domain ensemble model.

As shown in FIG. 2, at step 210, process 200 may include determining whether the output score satisfies a threshold. For example, ensemble model system(s) 106 may determine the output score satisfies a threshold.

As shown in FIG. 2, at step 212, process 200 may include taking action in response to the determination of whether the output score satisfies the threshold. For example, ensemble model system(s) 106 may take action based on the determination. In some non-limiting embodiments or aspects, taking action may include ensemble model system(s) 106 communicating an alert to a user device 108, generating a feature importance vector, or updating parameters of at least one of the ensemble models. Additionally or alternatively, ensemble model system(s) 106 may determine whether to label or communicate the (at least a portion of) the multivariate sequence.

In some non-limiting embodiments or aspects, in response to determining that the output score satisfies the threshold, ensemble model system(s) 106 may communicate an alert to a user device 108.

In some non-limiting embodiments or aspects, in response to determining that the output score satisfies the threshold, ensemble model system(s) 106 may input the multivariate sequence data into the feature-domain ensemble model to generate a feature importance vector. For example, the feature importance vector may include a feature importance score for each variable of the plurality of variables.

In some non-limiting embodiments or aspects, in response to determining that the output score satisfies the threshold, ensemble model system(s) 106 may update parameters of at least one of the combined ensemble model, the model-domain ensemble model, the time-domain ensemble model, the feature-domain ensemble model, or any combination thereof.

In some non-limiting embodiments or aspects, updating the ensemble model(s) may include ensemble model system(s) 106 initializing the combined ensemble model. Additionally or alternatively, for every time step less than a maximum time step, ensemble model system(s) 106 may determine a first temporary variable based on the combined intermediate data and a current time step version of combined ensemble model, determine a second temporary variable based on a ratio of labels to the first temporary variable, backpropagate the feature-domain ensemble model based on a transpose of the combined intermediate data and the second temporary variable, and/or determine a next time step version of combined ensemble model based on backpropagation of the feature-domain ensemble model and the current time step version of combined ensemble model.

In some non-limiting embodiments or aspects, updating the ensemble model(s) may include, for every time step less than the maximum time step, ensemble model system(s) 106 determining a third temporary variable based on a first Khatri-Rao product based on a current time step version of the time-domain ensemble model and a current time step version of the feature-domain ensemble model; determining a current time step version of the model-domain ensemble model based on the third temporary variable, the model-domain ensemble model, and a tensor unfolding in mode 0 of the combined ensemble model; determining a fourth temporary variable based on a second Khatri-Rao product based on the current time step version of the model-domain ensemble model and the current time step version of the feature-domain ensemble model; determining an updated current time step version of the time-domain ensemble model based on the fourth temporary variable, the time-domain ensemble model, and a tensor unfolding in mode 1 of the combined ensemble model; determining a fifth temporary variable based on a third Khatri-Rao product based on the current time step version of the model-domain ensemble model and the updated current time step version of the time-domain ensemble model; and determining an updated current time step version of the feature-domain ensemble model based on the fifth temporary variable, the feature-domain ensemble model, and a tensor unfolding in mode 2 of the combined ensemble model.

In some non-limiting embodiments or aspects, a loss function of the combined ensemble model may be based on the model-domain ensemble model, the time-domain ensemble model, and the feature-domain ensemble model. For example, the loss function of the combined ensemble model may be based on the following equation:

$$L(M, T, F) = \frac{1}{2}|H - MTF|^2 + \frac{\lambda_1}{2}(|M|^2 + |T|^2 + |F|^2) + \frac{\lambda_2}{2}|I - ZF|^2$$

wherein M is the model-domain ensemble model, T is the time-domain ensemble model, F is the feature-domain ensemble model, H is the combined ensemble model, I is the feature importance vector, and Z is the multivariate sequence data.

In some non-limiting embodiments or aspects, ensemble model system(s) 106 may determine whether to label or communicate the at least the portion of the multivariate sequence data based on the output score. For example, in response to determining to label, ensemble model system(s) 106 may label the at least the portion of the multivariate sequence data based on the output score. Additionally or alternatively, in response to determining to communicate, ensemble model system(s) 106 may communicate the at least the portion of the multivariate sequence data and the output score to user device 108.

Figure 3:
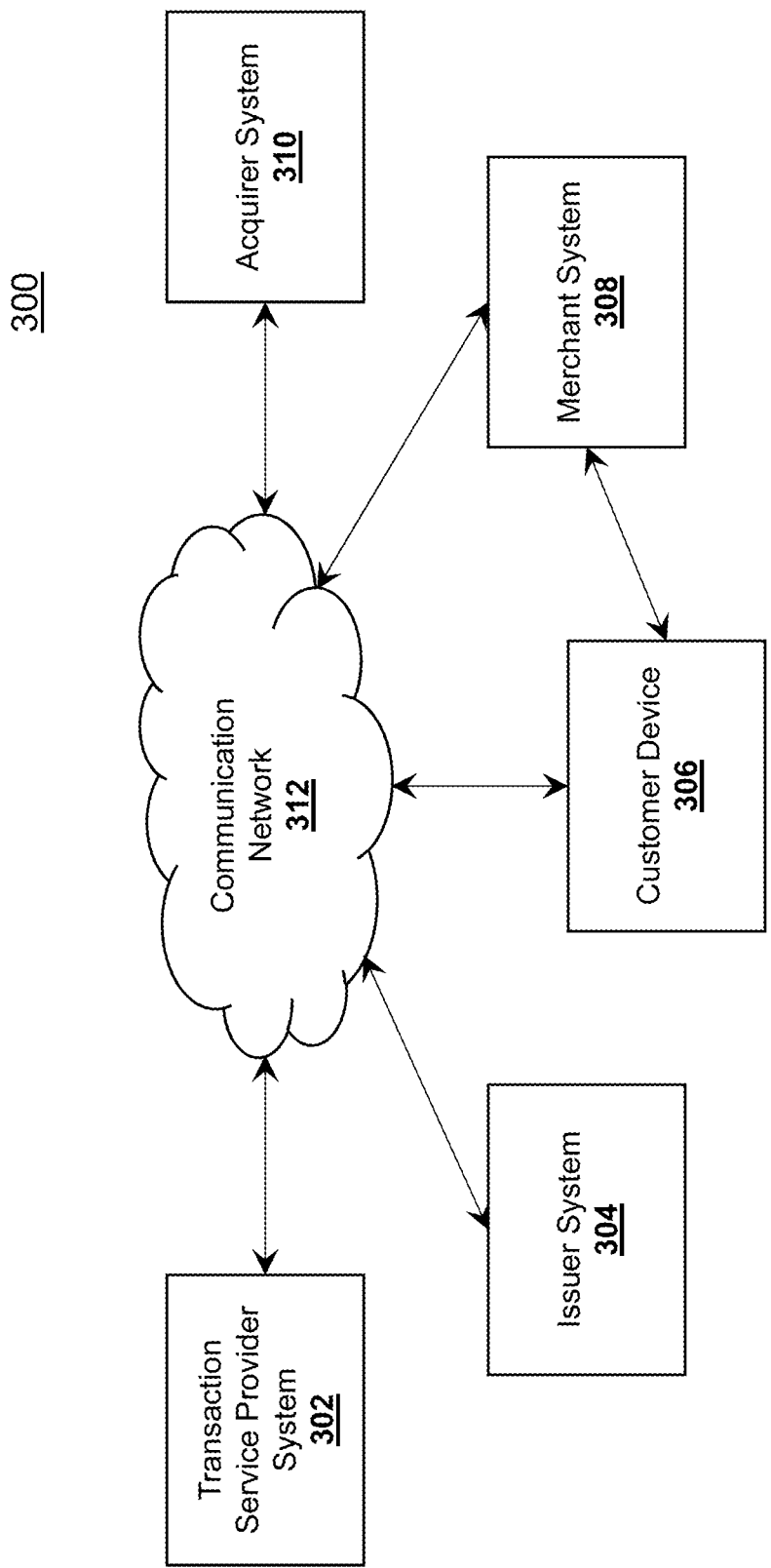
FIG. 3 is a diagram of an exemplary environment in which methods, systems, and/or computer program products, described herein, may be implemented, according to some non-limiting embodiments or aspects.

Referring now to FIG. 3, FIG. 3 is a diagram of an exemplary environment 300 in which systems, products, and/or methods, as described herein, may be implemented, according to some non-limiting embodiments or aspects. As shown in FIG. 3, environment 300 may include transaction service provider system 302, issuer system 304, customer device 306, merchant system 308, acquirer system 310, and communication network 312. In some non-limiting embodiments or aspects, each of time sequence data database 102, anomaly detection model system(s) 104, ensemble model system(s) 106, and/or user device 108 may be implemented by (e.g., part of) transaction service provider system 302. In some non-limiting embodiments or aspects, at least one of time sequence data database 102, anomaly detection model system(s) 104, ensemble model system(s) 106, and/or user device 108 may be implemented by (e.g., part of) another system, another device, another group of systems, or another group of devices, separate from or including transaction service provider system 302, such as issuer system 304, merchant system 308, acquirer system 310, and/or the like.

Transaction service provider system 302 may include one or more devices capable of receiving information from and/or communicating information to issuer system 304, customer device 306, merchant system 308, and/or acquirer system 310 via communication network 312. For example, transaction service provider system 302 may include a computing device, such as a server (e.g., a transaction processing server), a group of servers, and/or other like devices. In some non-limiting embodiments or aspects, transaction service provider system 302 may be associated with a transaction service provider, as described herein. In some non-limiting embodiments or aspects, transaction service provider system 302 may be in communication with a data storage device, which may be local or remote to transaction service provider system 302. In some non-limiting embodiments or aspects, transaction service provider system 302 may be capable of receiving information from, storing information in, communicating information to, or searching information stored in the data storage device.

Issuer system 304 may include one or more devices capable of receiving information and/or communicating information to transaction service provider system 302, customer device 306, merchant system 308, and/or acquirer system 310 via communication network 312. For example, issuer system 304 may include a computing device, such as a server, a group of servers, and/or other like devices. In some non-limiting embodiments or aspects, issuer system 304 may be associated with an issuer institution, as described herein. For example, issuer system 304 may be associated with an issuer institution that issued a credit account, debit account, credit card, debit card, and/or the like to a user associated with customer device 306.

Customer device 306 may include one or more devices capable of receiving information from and/or communicating information to transaction service provider system 302, issuer system 304, merchant system 308, and/or acquirer system 310 via communication network 312. Additionally or alternatively, each customer device 306 may include a device capable of receiving information from and/or communicating information to other customer devices 306 via communication network 312, another network (e.g., an ad hoc network, a local network, a private network, a virtual private network, and/or the like), and/or any other suitable communication technique. For example, customer device 306 may include a client device and/or the like. In some non-limiting embodiments or aspects, customer device 306 may or may not be capable of receiving information (e.g., from merchant system 308 or from another customer device 306) via a short-range wireless communication connection (e.g., an NFC communication connection, an RFID communication connection, a Bluetooth® communication connection, a Zigbee® communication connection, and/or the like), and/or communicating information (e.g., to merchant system 308) via a short-range wireless communication connection.

Merchant system 308 may include one or more devices capable of receiving information from and/or communicating information to transaction service provider system 302, issuer system 304, customer device 306, and/or acquirer system 310 via communication network 312. Merchant system 308 may also include a device capable of receiving information from customer device 306 via communication network 312, a communication connection (e.g., an NFC communication connection, an RFID communication connection, a Bluetooth® communication connection, a Zigbee® communication connection, and/or the like) with customer device 306, and/or the like, and/or communicating information to customer device 306 via communication network 312, the communication connection, and/or the like. In some non-limiting embodiments or aspects, merchant system 308 may include a computing device, such as a server, a group of servers, a client device, a group of client devices, and/or other like devices. In some non-limiting embodiments or aspects, merchant system 308 may be associated with a merchant, as described herein. In some non-limiting embodiments or aspects, merchant system 308 may include one or more client devices. For example, merchant system 308 may include a client device that allows a merchant to communicate information to transaction service provider system 302. In some non-limiting embodiments or aspects, merchant system 308 may include one or more devices, such as computers, computer systems, and/or peripheral devices capable of being used by a merchant to conduct a transaction with a user. For example, merchant system 308 may include a POS device and/or a POS system.

Acquirer system 310 may include one or more devices capable of receiving information from and/or communicating information to transaction service provider system 302, issuer system 304, customer device 306, and/or merchant system 308 via communication network 312. For example, acquirer system 310 may include a computing device, a server, a group of servers, and/or the like. In some non-limiting embodiments or aspects, acquirer system 310 may be associated with an acquirer, as described herein.

Communication network 312 may include one or more wired and/or wireless networks. For example, communication network 312 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

In some non-limiting embodiments or aspects, processing a transaction may include generating and/or communicating at least one transaction message (e.g., authorization request, authorization response, any combination thereof, and/or the like). For example, a client device (e.g., customer device 306, a POS device of merchant system 308, and/or the like) may initiate the transaction, e.g., by generating an authorization request. Additionally or alternatively, the client device (e.g., customer device 306, at least on device of merchant system 308, and/or the like) may communicate the authorization request. For example, customer device 306 may communicate the authorization request to merchant system 308 and/or a payment gateway (e.g., a payment gateway of transaction service provider system 302, a third-party payment gateway separate from transaction service provider system 302, and/or the like). Additionally or alternatively, merchant system 308 (e.g., a POS device thereof) may communicate the authorization request to acquirer system 310 and/or a payment gateway. In some non-limiting embodiments or aspects, acquirer system 310 and/or a payment gateway may communicate the authorization request to transaction service provider system 302 and/or issuer system 304. Additionally or alternatively, transaction service provider system 302 may communicate the authorization request to issuer system 304. In some non-limiting embodiments or aspects, issuer system 304 may determine an authorization decision (e.g., authorize, decline, and/or the like) based on the authorization request. For example, the authorization request may cause issuer system 304 to determine the authorization decision based thereof. In some non-limiting embodiments or aspects, issuer system 304 may generate an authorization response based on the authorization decision. Additionally or alternatively, issuer system 304 may communicate the authorization response. For example, issuer system 304 may communicate the authorization response to transaction service provider system 302 and/or a payment gateway. Additionally or alternatively, transaction service provider system 302 and/or a payment gateway may communicate the authorization response to acquirer system 310, merchant system 308, and/or customer device 306. Additionally or alternatively, acquirer system 310 may communicate the authorization response to merchant system 308 and/or a payment gateway. Additionally or alternatively, a payment gateway may communicate the authorization response to merchant system 308 and/or customer device 306. Additionally or alternatively, merchant system 308 may communicate the authorization response to customer device 306. In some non-limiting embodiments or aspects, merchant system 308 may receive (e.g., from acquirer system 310 and/or a payment gateway) the authorization response. Additionally or alternatively, merchant system 308 may complete the transaction based on the authorization response (e.g., provide, ship, and/or deliver goods and/or services associated with the transaction; fulfill an order associated with the transaction; any combination thereof; and/or the like).

For the purpose of illustration, processing a transaction may include generating a transaction message (e.g., authorization request and/or the like) based on an account identifier of a customer (e.g., associated with customer device 306 and/or the like) and/or transaction data associated with the transaction. For example, merchant system 308 (e.g., a client device of merchant system 308, a POS device of merchant system 308, and/or the like) may initiate the transaction, e.g., by generating an authorization request (e.g., in response to receiving the account identifier from a portable financial device of the customer and/or the like). Additionally or alternatively, merchant system 308 may communicate the authorization request to acquirer system 310. Additionally or alternatively, acquirer system 310 may communicate the authorization request to transaction service provider system 302. Additionally or alternatively, transaction service provider system 302 may communicate the authorization request to issuer system 304. Issuer system 304 may determine an authorization decision (e.g., authorize, decline, and/or the like) based on the authorization request, and/or issuer system 304 may generate an authorization response based on the authorization decision and/or the authorization request. Additionally or alternatively, issuer system 304 may communicate the authorization response to transaction service provider system 302. Additionally or alternatively, transaction service provider system 302 may communicate the authorization response to acquirer system 310, which may communicate the authorization response to merchant system 308.

For the purpose of illustration, clearing and/or settlement of a transaction may include generating a message (e.g., clearing message, settlement message, and/or the like) based on an account identifier of a customer (e.g., associated with customer device 306 and/or the like) and/or transaction data associated with the transaction. For example, merchant system 308 may generate at least one clearing message (e.g., a plurality of clearing messages, a batch of clearing messages, and/or the like). Additionally or alternatively, merchant system 308 may communicate the clearing message(s) to acquirer system 310. Additionally or alternatively, acquirer system 310 may communicate the clearing message(s) to transaction service provider system 302. Additionally or alternatively, transaction service provider system 302 may communicate the clearing message(s) to issuer system 304. Additionally or alternatively, issuer system 304 may generate at least one settlement message based on the clearing message(s). Additionally or alternatively, issuer system 304 may communicate the settlement message(s) and/or funds to transaction service provider system 302 (and/or a settlement bank system associated with transaction service provider system 302). Additionally or alternatively, transaction service provider system 302 (and/or the settlement bank system) may communicate the settlement message(s) and/or funds to acquirer system 310, which may communicate the settlement message(s) and/or funds to merchant system 308 (and/or an account associated with merchant system 308).

The number and arrangement of systems, devices, and/or networks shown in FIG. 3 are provided as an example. There may be additional systems, devices, and/or networks; fewer systems, devices, and/or networks; different systems, devices, and/or networks; and/or differently arranged systems, devices, and/or networks than those shown in FIG. 3. Furthermore, two or more systems or devices shown in FIG. 3 may be implemented within a single system or device, or a single system or device shown in FIG. 3 may be implemented as multiple, distributed systems or devices. Additionally or alternatively, a set of systems (e.g., one or more systems) or a set of devices (e.g., one or more devices) of environment 300 may perform one or more functions described as being performed by another set of systems or another set of devices of environment 300.

Figure 4:
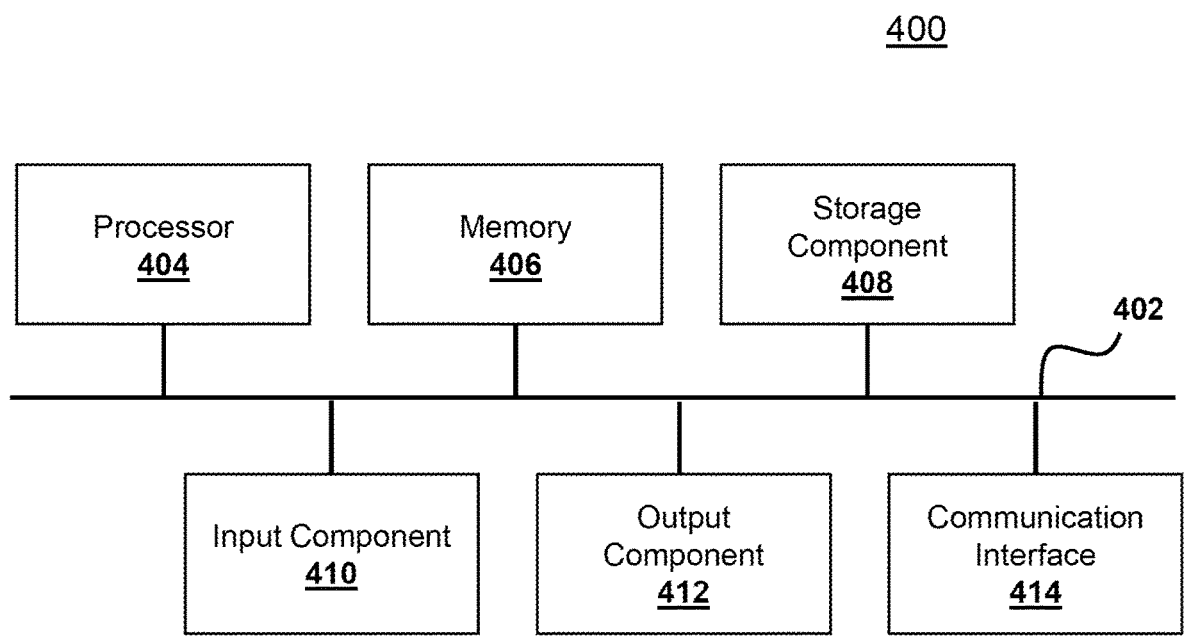
FIG. 4 is a schematic diagram of example components of one or more devices of FIG. 1 and/or FIG. 3, according to some non-limiting embodiments or aspects.

Referring now to FIG. 4, shown is a diagram of example components of a device 400, according to non-limiting embodiments or aspects. Device 400 may correspond to at least one of time sequence data database 102, anomaly detection model system(s) 104, ensemble model system(s) 106, and/or user device 108 in FIG. 1 and/or at least one of transaction service provider system 302, issuer system 304, customer device 306, merchant system 308, and/or acquirer system 310 in FIG. 3, as an example. In some non-limiting embodiments or aspects, such systems or devices may include at least one device 400 and/or at least one component of device 400. The number and arrangement of components shown are provided as an example. In some non-limiting embodiments or aspects, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

As shown in FIG. 4, device 400 may include a bus 402, a processor 404, memory 406, a storage component 408, an input component 410, an output component 412, and a communication interface 414. Bus 402 may include a component that permits communication among the components of device 400. In some non-limiting embodiments or aspects, processor 404 may be implemented in hardware, firmware, or a combination of hardware and software. For example, processor 404 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 406 may include random access memory (RAM), read only memory (ROM), and/or another type of dynamic or static storage device (e.g., flash memory, magnetic memory, optical memory, etc.) that stores information and/or instructions for use by processor 404.

With continued reference to FIG. 4, storage component 408 may store information and/or software related to the operation and use of device 400. For example, storage component 408 may include a hard disk (e.g., a magnetic disk, an optical disk, a magneto-optic disk, a solid state disk, etc.) and/or another type of computer-readable medium. Input component 410 may include a component that permits device 400 to receive information, such as via user input (e.g., a touch screen display, a keyboard, a keypad, a mouse, a button, a switch, a microphone, etc.). Additionally, or alternatively, input component 410 may include a sensor for sensing information (e.g., a global positioning system (GPS) component, an accelerometer, a gyroscope, an actuator, etc.). Output component 412 may include a component that provides output information from device 400 (e.g., a display, a speaker, one or more light-emitting diodes (LEDs), etc.). Communication interface 414 may include a transceiver-like component (e.g., a transceiver, a separate receiver and transmitter, etc.) that enables device 400 to communicate with other devices, such as via a wired connection, a wireless connection, or a combination of wired and wireless connections. Communication interface 414 may permit device 400 to receive information from another device and/or provide information to another device. For example, communication interface 414 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 400 may perform one or more processes described herein. Device 400 may perform these processes based on processor 404 executing software instructions stored by a computer-readable medium, such as memory 406 and/or storage component 408. A computer-readable medium may include any non-transitory memory device. A memory device includes memory space located inside of a single physical storage device or memory space spread across multiple physical storage devices. Software instructions may be read into memory 406 and/or storage component 408 from another computer-readable medium or from another device via communication interface 414. When executed, software instructions stored in memory 406 and/or storage component 408 may cause processor 404 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Figure 5:
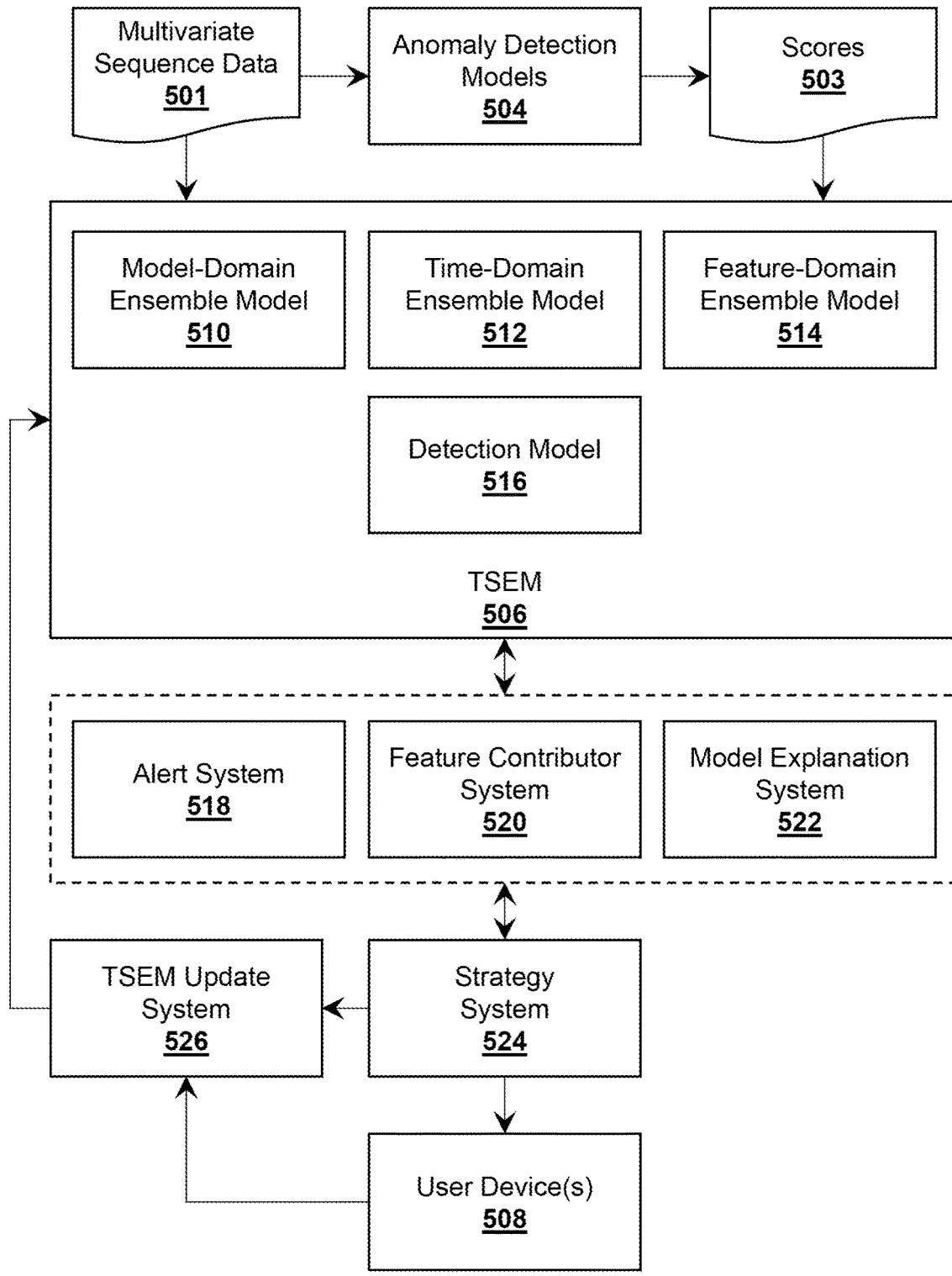
FIG. 5 is a schematic diagram of an example implementation of a system for multi-domain ensemble learning based on multivariate time sequence data, according to some non-limiting embodiments or aspects.

Referring now to FIG. 5, shown is a diagram of an example implementation 500 of a system for multi-domain ensemble learning based on multivariate time sequence data, according to some non-limiting embodiments or aspects. As shown in FIG. 5, implementation 500 may include multivariate time sequence data 501, scores 503, anomaly detection models 504, time-series sequences ensemble model (TSEM) 506, user device 508, model-domain ensemble model 510, time-domain ensemble model 512, feature-domain ensemble model 514, detection model 516, alert system 518, feature contributor system 520, model explanation system 522, strategy system 524, and/or TSEM update system 526. In some non-limiting embodiments or aspects, implementation 500 may be the same as, similar to, and/or part of system 100. In some non-limiting embodiments or aspects, multivariate time sequence data 501 may be stored in a database (e.g., time sequence data database 102 and/or the like). In some non-limiting embodiments or aspects, anomaly detection models 504 may be the same as, similar to, and/or part of anomaly detection model system(s) 104. In some non-limiting embodiments or aspects, scores 503 may be the outputs of the anomaly detection models 504, as described herein. In some non-limiting embodiments or aspects, TSEM 506 may be the same as, similar to, and/or part of ensemble model system(s) 106. In some non-limiting embodiments or aspects, user device(s) 508 may be the same as or similar to user device 108. In some non-limiting embodiments or aspects, model-domain ensemble model 510, time-domain ensemble model 512, feature-domain ensemble model 514, and/or detection model 516 may be part of TSEM 506 and/or may be the same as, similar to, and/or part of ensemble model system(s) 106. In some non-limiting embodiments or aspects, alert system 518, feature contributor system 520, model explanation system 522, strategy system 524, and/or TSEM update system 526 may be the same as, similar to, and/or part of ensemble model system(s) 106. In some non-limiting embodiments or aspects, at least one of alert system 518, feature contributor system 520, model explanation system 522, strategy system 524, and/or TSEM update system 526 may be another system separate from ensemble model system(s) 106 and/or may be a part of another system separate from or including ensemble model system(s) 106. The number and arrangement of components (e.g., data, scores, models, devices, and/or systems) of implementation 500 shown are provided as an example. In some non-limiting embodiments or aspects, implementation 500 may include additional components, fewer components, different components, or differently arranged components than those shown in FIG. 5. Additionally, or alternatively, a set of components (e.g., one or more components) of implementation 500 may perform one or more functions described as being performed by another set of components of implementation 500.

In some non-limiting embodiments or aspects, anomaly detection models 504 may receive multivariate sequence data 501, as described herein. Additionally or alternatively, TSEM 506 may receive multivariate sequence data 501, as described herein. In some non-limiting embodiments or aspects, multivariate sequence data 501 may include a plurality of vectors, each including elements based on a time sequence for a respective variable of a plurality of variables, as described herein.

In some non-limiting embodiments or aspects, at least a portion of multivariate sequence data 501 may be inputted into each respective anomaly detection model 504 to generate a plurality of scores 503, as described herein. For example, scores 503 may include a respective score for each respective anomaly detection model 504. In some non-limiting embodiments or aspects, anomaly detection models 504 may include at least one change point model. Additionally or alternatively, score(s) 503 may include at least one change point score for the respective change point model.

In some non-limiting embodiments or aspects, multivariate sequence data 501 may be combined with scores 503 (e.g., by TSEM 506 and/or the like) to generate combined intermediate data, as described herein.

In some non-limiting embodiments or aspects, the combined intermediate data may be inputted into TSEM 506, which may include a combined ensemble model, to generate an output score, as described herein. For example, TSEM 506 may include a combined ensemble model based on model-domain ensemble model 510, a time-domain ensemble model 512, and a feature-domain ensemble model 514, as described herein.

In some non-limiting embodiments or aspects, detection model 516 may determine that the output score satisfies a threshold, as described herein.

In some non-limiting embodiments or aspects, in response to determining that the output score satisfies the threshold, alert system 518 may communicate an alert to at least one user device 508, as described herein. For example, alert system 518 may communicate an alert to strategy system 524, which may communicate the alert to user device 508. In some non-limiting embodiments or aspects, alert system 518 and/or strategy system 524 may communicate selected records from multivariate sequence data 501 (e.g., the records of multivariate sequence data 501 that caused detection model 516 to detect an anomaly based on the output score satisfying the threshold) to the user device(s) 508 (e.g., with the alert). In some non-limiting embodiments or aspects, user device(s) 508 may receive input (e.g., from user(s) of user device(s) 508 who reviewed the alert and/or selected records) indicating a true label for the selected records (e.g., a label indicating whether the records are, in fact, an anomaly as confirmed by human reviewers). The user devices 508 may communicate the inputs and/or true labels based thereon to TSEM update system 526. In some non-limiting embodiments or aspects, TSEM 506 and/or strategy system 524 may determine predicted labels for the selected records (e.g., a label indicating whether the records are predicted to be an anomaly as predicted by TSEM 506). TSEM 506 and/or strategy system 524 may communicate the predicted labels to TSEM update system 526. In some non-limiting embodiments or aspects, TSEM update system 526 may update parameters of at least one of TSEM 506 (e.g., combined ensemble model), model-domain ensemble model 510, time-domain ensemble model 512, and/or feature-domain ensemble model 514 (e.g., based on the true labels and/or predicted labels).

In some non-limiting embodiments or aspects, feature contributor system 520 may generate a feature importance vector, as described herein. For example, feature contributor system 520 may input multivariate sequence data 501 into feature-domain ensemble model 514 to generate a feature importance vector, which may include a feature importance score for each variable of the plurality of variables. In some non-limiting embodiments or aspects, feature contributor system 520 may communicate the feature importance vector to model explanation system 522. In some non-limiting embodiments or aspects, feature contributor system 520 and/or model explanation system 522 may communicate at least one communication based on the feature importance vector (e.g., a communication indicating the importance for each variable, such as the importance score, a ranking based on the importance score, and/or the like) to user device(s) 508 (e.g., via strategy system 524).

In some non-limiting embodiments or aspects, strategy system 524 may receive (e.g., from user device 508 and/or the like) and/or store the threshold (e.g., for detection model 516 to detect an anomaly). Additionally or alternatively, strategy system 524 may receive (e.g., from user device 508 and/or the like) and/or store conditions under which the communications described herein would be communicated to user device(s) 508.

Figure 6:
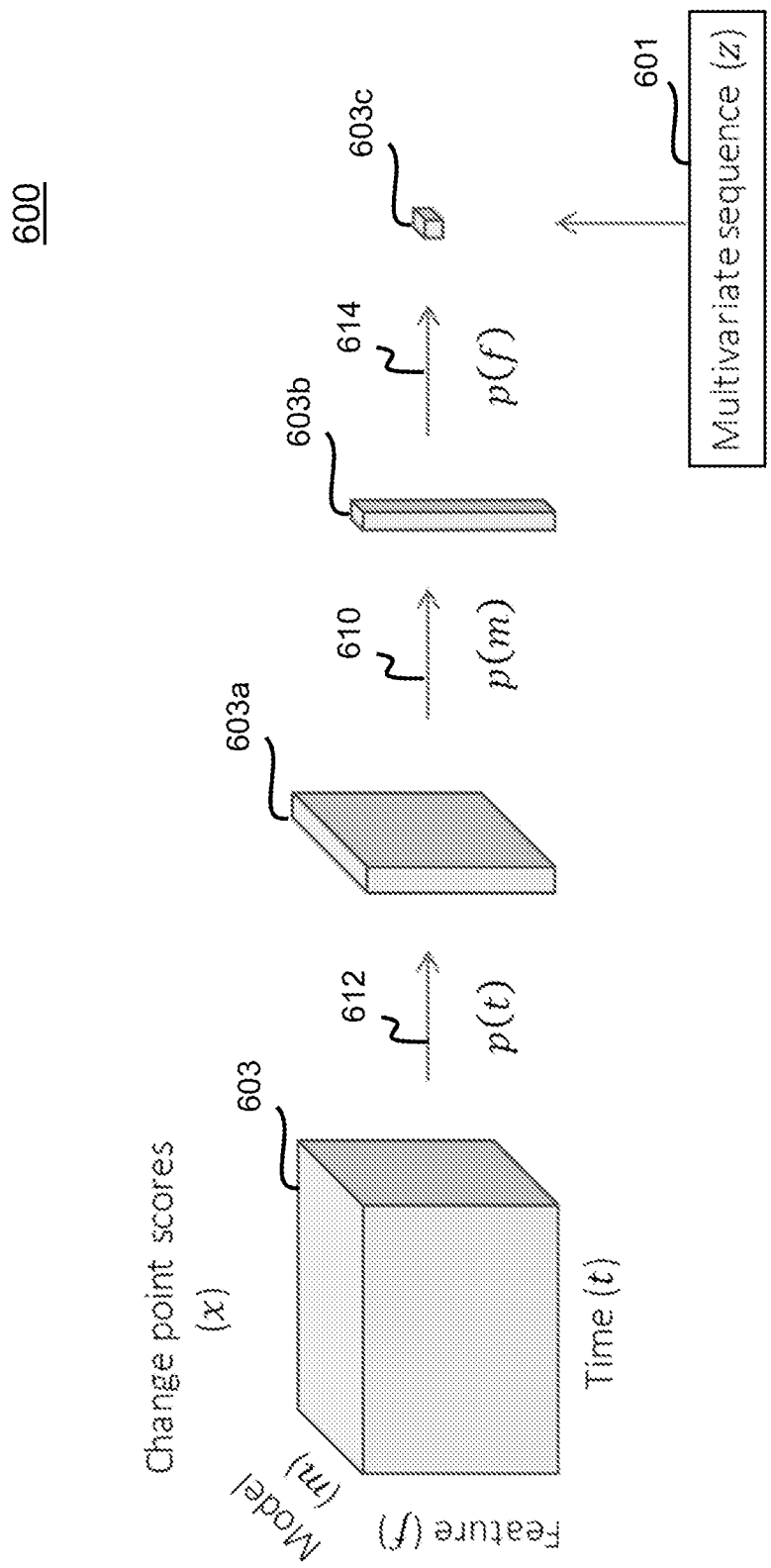
FIG. 6 is a schematic diagram of an example implementation of an ensemble model for multi-domain ensemble learning based on multivariate time sequence data, according to some non-limiting embodiments or aspects.

Referring now to FIG. 6, shown is a diagram of an example implementation 600 of a model for multi-domain ensemble learning based on multivariate time sequence data, according to some non-limiting embodiments or aspects. In some non-limiting embodiments or aspects, implementation 600 may be for unsupervised learning. In some non-limiting embodiments or aspects, implementation 600 may be implemented (e.g., completely, partially, and/or the like) by ensemble model system(s) 106 (e.g., one or more devices of ensemble model system(s) 106) and/or TSEM 506. In some non-limiting embodiments or aspects, change point scores (x) 603 may be the same as or similar to scores 503. In some non-limiting embodiments or aspects, multivariate sequence (z) 601 may be the same as or similar to multivariate time sequence data 501. The number and arrangement of components (e.g., tensors, matrices, vectors, values, scores, data, and/or operations) of implementation 600 shown are provided as an example. In some non-limiting embodiments or aspects, implementation 600 may include additional components, fewer components, different components, or differently arranged components than those shown in FIG. 6. Additionally, or alternatively, a set of components (e.g., one or more components) of implementation 600 may perform one or more functions described as being performed by another set of components of implementation 600.

In some non-limiting embodiments or aspects, change point scores (x) 603 may include a respective score from each respective model (m) (e.g., anomaly detection model, change point model, and/or the like) for each respective feature (f) at each respective time (t) (e.g., time step). As such, change point scores (x) 603 may include a tensor having three dimensions: time (t), feature (f), and model (m).

In some non-limiting embodiments or aspects, a time dimension reduction operation (p(t)) 612 may be applied to change point scores (x) 603 to reduce the time dimension to provide matrix 603a having two dimensions: feature (f), and model (m). For example, time dimension reduction operation (p(t)) 612 may include an exponential decay function over the time dimension (e.g., time axis) such that the closer a time stamp is to the current time (t), the more weight the time step has.

In some non-limiting embodiments or aspects, a model dimension reduction operation (p(m)) 610 may be applied to matrix 603a to reduce the model dimension to provide vector 603b having one dimension: feature (f). For example, model dimension reduction operation (p(m)) 610 may include an aggregation across each model (e.g., by taking an average over the scores for each model).

In some non-limiting embodiments or aspects, a feature dimension reduction operation (p(f)) 614 may be applied to vector 603b to reduce the feature dimension to provide a feature weight 603c for each feature (f) (e.g., at the current time (t)). For example, feature dimension reduction operation (p(f)) 614 may include a weighted sum of change point scores (x) 603 for that feature (e.g., as represented by vector 603b) and the raw values for that feature (e.g., from multivariate sequence (z) 601) in a selectable number (k) of past time steps.

Figure 7:
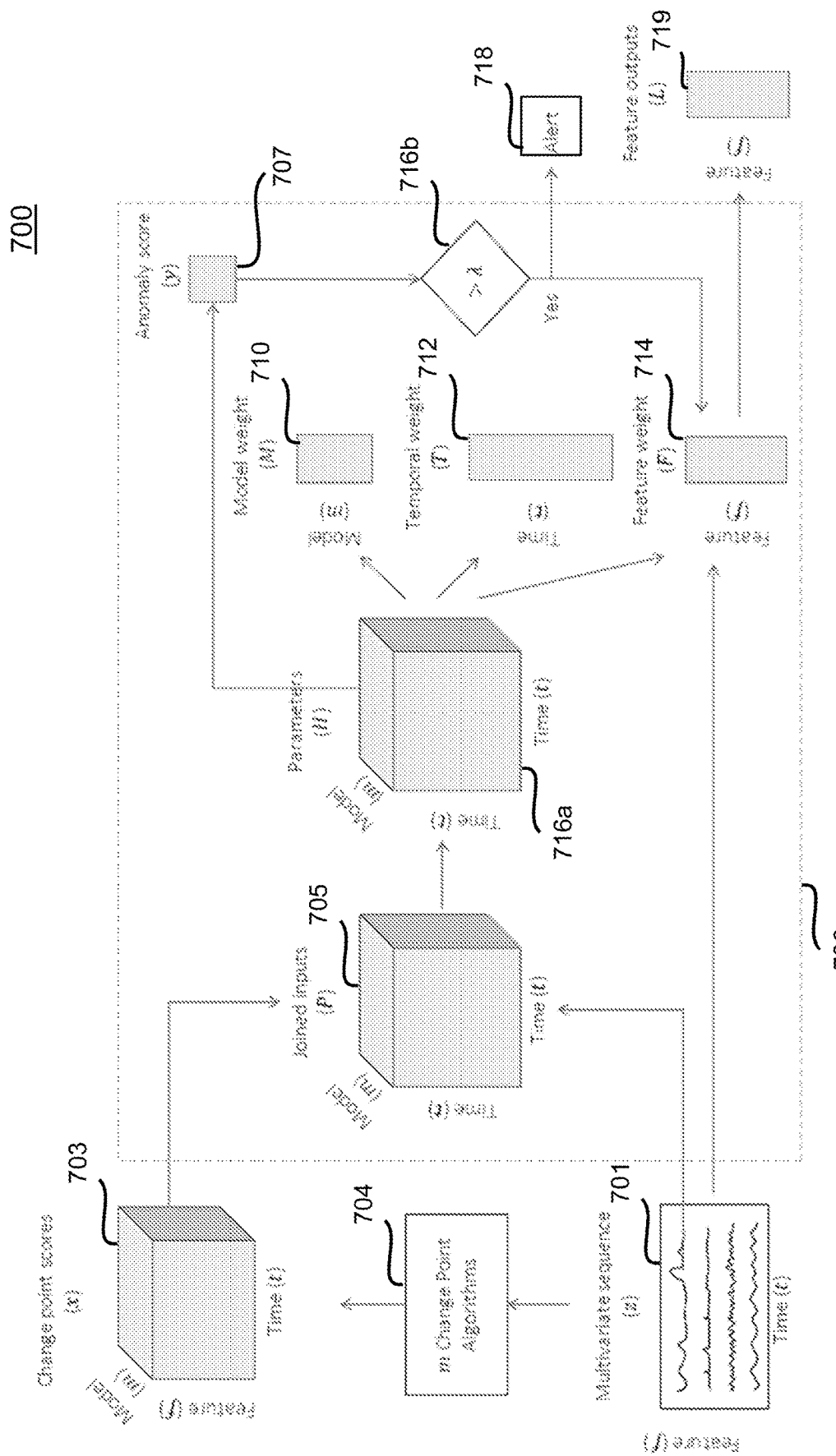
FIG. 7 is a schematic diagram of an example implementation of an ensemble model for multi-domain ensemble learning based on multivariate time sequence data, according to some non-limiting embodiments or aspects.

Referring now to FIG. 7, shown is a diagram of an example implementation 700 of a model for multi-domain ensemble learning based on multivariate time sequence data, according to some non-limiting embodiments or aspects. As shown in FIG. 7, implementation 700 may include multivariate sequence (z) 701, change point scores (x) 703, change point algorithms 704, joined inputs (P) 705, TSEM 706, anomaly score 707, model-domain ensemble model 710, time-domain ensemble model 712, feature-domain ensemble model 714, combined ensemble model 716a, detection model 716b, alert communication 718, and/or feature outputs 719. In some non-limiting embodiments or aspects, implementation 700 may be for semi-supervised learning. In some non-limiting embodiments or aspects, implementation 700 may be utilized in addition to (e.g., after) implementation 600 (e.g., semi-supervised learning after unsupervised learning). In some non-limiting embodiments or aspects, implementation 700 may be utilized independent of (e.g., in lieu of) implementation 600. In some non-limiting embodiments or aspects, implementation 700 may be implemented (e.g., completely, partially, and/or the like) by ensemble model system(s) 106 (e.g., one or more devices of ensemble model system(s) 106) and/or TSEM 506. In some non-limiting embodiments or aspects, multivariate sequence (z) 701 may be the same as or similar to multivariate time sequence data 501 and/or multivariate sequence (z) 601. In some non-limiting embodiments or aspects, change point scores (x) 703 may be the same as or similar to scores 503 and/or change point scores (x) 603. In some non-limiting embodiments or aspects, change point algorithms 704 may be the same as or similar to anomaly detection models 504. In some non-limiting embodiments or aspects, TSEM 706 may be the same as or similar to TSEM 506. In some non-limiting embodiments or aspects, model-domain ensemble model 710 may be the same as or similar to model-domain ensemble model 510. In some non-limiting embodiments or aspects, time-domain ensemble model 712 may be the same as or similar to time-domain ensemble model 512. In some non-limiting embodiments or aspects, feature-domain ensemble model 714 may be the same as or similar to feature-domain ensemble model 514. In some non-limiting embodiments or aspects, combined ensemble model 716a and/or detection model 716b may be the same as or similar to detection model 516. In some non-limiting embodiments or aspects, alert communication 718 may be the same as, similar to, and/or implemented by (e.g., communicated by) alert system 518. In some non-limiting embodiments or aspects, feature outputs 719 may be the same as, similar to, and/or implemented by (e.g., determined by and/or communicated by) feature contributor system 520 and/or model explanation system 522. The number and arrangement of components of implementation 700 shown are provided as an example. In some non-limiting embodiments or aspects, implementation 700 may include additional components, fewer components, different components, or differently arranged components than those shown in FIG. 7. Additionally, or alternatively, a set of components (e.g., one or more components) of implementation 700 may perform one or more functions described as being performed by another set of components of implementation 700.

In some non-limiting embodiments or aspects, multivariate sequence (z) 701 may be received, as described herein. For example, change point algorithms 704 and/or TSEM 706 may receive multivariate sequence (z) 701. In some non-limiting embodiments or aspects, multivariate sequence (z) 701 may include a plurality of vectors, and/or each respective vector of the plurality of vectors may include elements (e.g., values and/or the like) based on a time sequence (e.g., time steps in the time (t) dimension) for a respective feature (f) (e.g., variable) of a plurality of features, as described herein.

In some non-limiting embodiments or aspects, at least a portion of multivariate sequence (z) 701 may be inputted into each respective change point algorithm of the m change point algorithms 704 to generate change point scores (x) 703 (e.g., including a respective change point score for each respective anomaly detection model), as described herein. For example, change point algorithms 704 may receive multivariate sequence (z) 701 as input. In some non-limiting embodiments or aspects, change point scores (x) 703 may include a tensor having three dimensions: time (t), feature (f), and model (m).

In some non-limiting embodiments or aspects, multivariate sequence (z) 701 may be combined (e.g., by TSEM 706 and/or the like) with change point scores (x) 703 to generate joined inputs (P) 705 (e.g., combined intermediate data), as described herein. For example, joined inputs (P) 705 may be determined based on the following equation:

$$P = XZ^T$$

wherein X is the set (e.g., tensor) of all change point scores (x) 703, Z is the set (e.g., matrix) of all multivariate sequence (z) 701, and T is the transpose operation.

In some non-limiting embodiments or aspects, joined inputs (P) 705 may be inputted into combined ensemble model 716a to generate anomaly score (y) 707 (e.g., an output score), as described herein. In some non-limiting embodiments or aspects, combined ensemble model 716a may be based on model-domain ensemble model 710, time-domain ensemble model 712, and feature-domain ensemble model 714. For example, combined ensemble model 716a may be generated based on the following equation:

$$H = MTF,$$

wherein H is the combined ensemble model (e.g., the set of parameters thereof), M is the model-domain ensemble model (e.g., the set of model weights for each of m models), T is the time-domain ensemble model (e.g., the set of temporal weights for each of K time steps), F is the feature-domain ensemble model (e.g., the set of feature weights for each of the plurality of features).

In some non-limiting embodiments or aspects, detection model 716b may determine whether anomaly score (y) 707 satisfies a threshold A. For example, if anomaly score (y) 707 is greater than the threshold A, then the threshold A may be satisfied, and, therefore, detection model 716b may detect an anomaly.

In some non-limiting embodiments or aspects, at least one action may be taken (e.g., by TSEM 706 and/or the like) in response to determining that the output score satisfies the threshold. For example, alert communication 718 may be communicated (e.g., from TSEM 706, to a user device, and/or the like), as described herein. Additionally or alternatively, multivariate sequence (z) 701 may be inputted into feature-domain ensemble model 718 to generate feature outputs (L) 719 (e.g., a feature importance vector comprising a feature importance score for each feature of the plurality of features), as described herein. Additionally or alternatively, parameters (e.g., H, M, T, and/or F) of at least one of combined ensemble model 716a, model-domain ensemble model 710, time-domain ensemble model 712, and/or feature-domain ensemble model 714 may be updated (e.g., by TSEM 706 and/or the like). For example, the features of the aforementioned models may be updated based on the following algorithm:

| Algorithm 1 |
|---|
| 1:   procedure TSEMParameterInference |
| 2:       // Step 1 |
| 3:       Initialize $H^{(0)}$ |
| 4:       $P_j \leftarrow \Sigma_i P_{ij}$ |
| 5:       for t = 1...maxT do |
| 6:           $a^{(t)} \leftarrow PH^{(t)}$ |
| 7:           $b^{(t)} \leftarrow Y/a^{(t)}$ |
| 8:           $f^{(t)} \leftarrow P^T b^{(t)}$ |

-continued

Algorithm 1

9:  for j = 1...tmt do

10: $\quad H_j^{(t+1)} \leftarrow \frac{f_j^{(t)}}{X_j} H_j^{(t)}$ s.t. $P_j > 0$ 11: // Step 2
12: Initialize $T^{(0)}$ and $F^{(0)}$
13: for t = 1...maxT do
14: $\quad c^{(t)} \leftarrow T^{(t)} * F^{(t)}$
15: $\quad M^{(t)} \leftarrow \min (|c^{(t)}|^2 M - c^{(t)} \odot H_{[0]})^2$
16: $\quad c^{(t)} \leftarrow M^{(t)} * F^{(t)}$
17: $\quad T^{(t)} \leftarrow \min (|c^{(t)}|^2 T - c^{(t)} \odot H_{[1]})^2$
18: $\quad c^{(t)} \leftarrow M^{(t)} * T^{(t)}$
19: $\quad F^{(t)} \leftarrow \min (|c^{(t)}|^2 F - c^{(t)} \odot H_{[2]})^2$ In some non-limiting embodiments or aspects, as shown in Algorithm 1, at line 1, the name of the procedure may be TSEMParameterInference. As shown in Algorithm 1, at lines 2 and 11, comments may be added, e.g., to indicate a first portion of the algorithm (e.g., Step 1, which may include a portion of the algorithm for iteratively updating the parameters H of combined ensemble model 716a) and a second portion of the algorithm (e.g., Step 2, which may include updating the model weights M of model-domain ensemble model 710, the temporal weights T of time-domain ensemble model 712, and/or the feature weights F of feature-domain ensemble model 714).

In some non-limiting embodiments or aspects, as shown in Algorithm 1, at line 3, the parameters H of combined ensemble model 716a may be initialized. As shown in Algorithm 1, at line 4, a relevant portion of joined inputs (P) 705 may be determined. As shown in Algorithm 1, at lines 5-8, for every time step t less than a maximum time step maxT, a first temporary variable a(t) may be determined based on joined inputs (P) 705 and a current time step version of the parameters $H^{(t)}$ of combined ensemble model 716a; a second temporary variable $b^{(t)}$ may be determined based on a ratio of labels (e.g., true labels indicating whether a record of multivariate sequence (z) 701 is an anomaly) to the first temporary variable $a^{(t)}$; the feature weights $f^{(t)}$ may be backpropagated based on a transpose of joined inputs (P) 705 and the second temporary variable $b^{(t)}$; and a next time step version of the parameters $H^{(t+1)}$ of combined ensemble model 716a may be determined based on backpropagation of the feature weights $f^{(t)}$, the current time step version of the parameters $H^{(t)}$ of combined ensemble model 716a, and change point scores (X) 703.

In some non-limiting embodiments or aspects, as shown in Algorithm 1, at line 12, the temporal weights T of time-domain ensemble model 712 and the feature weights F of feature-domain ensemble model 714 may be initialized. As shown in Algorithm 1, at lines 13-19, for every time step t less than the maximum time step maxT, a third temporary variable $c^{(t)}$ may be determined based on a Khatri-Rao product of a current time step version of the temporal weights $T^{(t)}$ of time-domain ensemble model 712 and the feature weights $F^{(t)}$ of feature-domain ensemble model 714; a current time step version of the model weights $M^{(t)}$ of model-domain ensemble model 710 may be determined based on the third temporary variable $c^{(t)}$, the model weights M of model-domain ensemble model 710, and a tensor unfolding in mode 0 of the parameters H of combined ensemble model 716a; a temporary variable (e.g., a fourth temporary variable, the third temporary variable being reused, and/or the like) may be determined based on a Khatri-Rao product of the current time step version of the model weights $M^{(t)}$ of model-domain ensemble model 710 and the feature weights $F^{(t)}$ of feature-domain ensemble model 714; an updated current time step version of the temporal weights $T^{(t)}$ of time-domain ensemble model 712 may be determined based on the (fourth) temporary variable, the temporal weights T of time-domain ensemble model 712, and a tensor unfolding in mode 1 of the parameters H of combined ensemble model 716a; a fifth temporary variable (e.g., firth temporary variable, third temporary variable being reused, and/or the like) may be determined based on a Khatri-Rao product of the current time step version of the model weights $M^{(t)}$ of model-domain ensemble model 710 and the (updated) temporal weights $T^{(t)}$ of time-domain ensemble model 712; and an updated current time step version of the features weights $F^{(t)}$ of feature-domain ensemble model 714 may be determined based on the (fifth) temporary variable, the feature weights F of feature-domain ensemble model 714, and a tensor unfolding in mode 2 of the parameters H of combined ensemble model 716a.

In some non-limiting embodiments, a TSEM for unsupervised learning (TSEM-un) and/or a TSEM for semi-supervised learning (TSEM-semi), as described herein, may outperform individual change point algorithms (e.g., Bayesian change point detection (BCPD), ChageFinder (CF), KLIEP, CUSUM) and/or an ensemble model combining such change point algorithms without applying the techniques described herein. For example, Table 3 shows the performance in terms of recall, precision, F-1 score, and AUC for each of these techniques for the Server Machine Dataset (SMD) (Su et al., *Robust Anomaly Detection for Multivariate Time Series through Stochastic Recurrent Neural Network*, KDD '19: Proceedings of the 25th ACM SIGKDD International Conference on Knowledge Discovery & Data Mining (2019), the disclosure of which is hereby incorporated by reference in its entirety):

TABLE 3

| Technique | Recall (%) | Precision (%) | F-1 Score (%) | AUC (%) |
| --- | --- | --- | --- | --- |
| BCPD | 35.32 | 0.21 | 0.42 | 62.53 |
| CF | 19.52 | 0.31 | 0.61 | 57.37 |
| KLIEP | 11.93 | 0.22 | 0.43 | 54.25 |
| CUSUM | 21.78 | 0.14 | 0.28 | 56.02 |
| Ensemble | 35.55 | 0.25 | 0.49 | 62.43 |
| TSEM-un | 53.61 | 0.65 | 1.28 | 73.34 |
| TSEM-semi | 84.06 | 0.79 | 1.56 | 87.22 |

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

The invention claimed is:

1. A computer-implemented method, comprising:
receiving, with at least one processor, multivariate sequence data comprising a plurality of vectors, each vector of the plurality of vectors comprising elements based on a time sequence for a respective variable of a plurality of variables;

generating, with the at least one processor, a plurality of scores comprising a respective score for each anomaly detection model based on inputting at least a portion of the multivariate sequence data into each anomaly detection model of a plurality of anomaly detection models;

combining, with the at least one processor, the multivariate sequence data with the plurality of scores to generate combined intermediate data;

generating, with the at least one processor, an output score based on inputting the combined intermediate data into a time-series sequences ensemble model (TSEM), the TSEM based on a model-domain ensemble model, a time-domain ensemble model, and a feature-domain ensemble model;

determining, with the at least one processor, that the output score generated based on the combined intermediate data satisfies a threshold; and in response to determining that the output score generated based on the combined intermediate data satisfies the threshold:

updating, with the at least one processor, parameters of at least one of the TSEM or the feature-domain ensemble model, wherein updating the parameters of at least one of the TSEM or the feature-domain ensemble model comprises, for every time step less than a maximum time step:

determining, with the at least one processor, a first variable based on the combined intermediate data and a current time step version of the TSEM;

determining, with the at least one processor, a second variable based on a ratio of labels to the first variable;

backpropagating, with the at least one processor, the feature-domain ensemble model based on a transpose of the combined intermediate data and the second variable; and determining, with the at least one processor, a next time step version of the TSEM based on backpropagation of the feature-domain ensemble model and the current time step version of the TSEM.

2. The method of claim 1, wherein each anomaly detection model of the plurality of anomaly detection models comprises at least one of a classifier model or a score generation model.

3. The method of claim 1, wherein each anomaly detection model of the plurality of anomaly detection models comprises at least one of a Bayesian model, a Kullback-Leibler importance estimation procedure (KLIEP) model, a ChangeFinder model, or a cumulative sum (CUSUM) model.

4. The method of claim 1, further comprising:
determining, with at least one processor, whether to label or communicate the at least the portion of the multivariate sequence data based on the output score; and
in response to determining whether to label or communicate the at least the portion of the multivariate sequence data, one of:
labeling, with at least one processor, the at least the portion of the multivariate sequence data based on the output score; or
communicating, with at least one processor, the at least the portion of the multivariate sequence data and the output score to the user device.

5. The method of claim 1, wherein updating the parameters of at least one of the TSEM or the feature-domain ensemble model comprises:
initializing, with at least one processor, the TSEM.

6. The method of claim 5, wherein updating the parameters of at least one of the TSEM or the feature-domain ensemble model further comprises:
for every time step less than the maximum time step:
determining, with at least one processor, a third variable based on a first Khatri-Rao product based on a current time step version of the time-domain ensemble model and a current time step version of the feature-domain ensemble model;
determining, with at least one processor, a current time step version of the model-domain ensemble model based on the third variable, the model-domain ensemble model, and a tensor unfolding in mode 0 of the TSEM;
determining, with at least one processor, a fourth variable based on a second Khatri-Rao product based on the current time step version of the model-domain ensemble model and the current time step version of the feature-domain ensemble model;
determining, with at least one processor, an updated current time step version of the time-domain ensemble model based on the fourth variable, the time-domain ensemble model, and a tensor unfolding in mode 1 of the TSEM;
determining, with at least one processor, a fifth variable based on a third Khatri-Rao product based on the current time step version of the model-domain ensemble model and the updated current time step version of the time-domain ensemble model; and
determining, with at least one processor, an updated current time step version of the feature-domain ensemble model based on the fifth variable, the feature-domain ensemble model, and a tensor unfolding in mode 2 of the TSEM.

7. The method of claim 1, wherein a loss function of the TSEM is based on the model-domain ensemble model, the time-domain ensemble model, and the feature-domain ensemble model.

8. The method of claim 7, wherein the loss function of the TSEM is based on the following equation:

$$L(M, T, F) = \frac{1}{2}|H - MTF|^2 + \frac{\lambda_1}{2}(|M|^2 + |T|^2 + |F|^2) + \frac{\lambda_2}{2}|I - ZF|^2$$

wherein M is the model-domain ensemble model, T is the time-domain ensemble model, F is the feature-domain ensemble model, H is the TSEM, I is the feature importance vector, Z is the multivariate sequence data, $\lambda_1$ is a first coefficient, and $\lambda_2$ is a second coefficient.

9. A system, comprising:
at least one processor; and
at least one non-transitory computer-readable medium including one or more instructions that, when executed by at least one processor, direct the at least one processor to:
receive multivariate sequence data comprising a plurality of vectors, each vector of the plurality of vectors comprising elements based on a time sequence for a respective variable of a plurality of variables;

generate a plurality of scores comprising a respective score for each anomaly detection model based on inputting at least a portion of the multivariate sequence data into each anomaly detection model of a plurality of anomaly detection models;

combine the multivariate sequence data with the plurality of scores to generate combined intermediate data;

generate an output score based on inputting the combined intermediate data into a time-series sequences ensemble model (TSEM), the TSEM based on a model-domain ensemble model, a time-domain ensemble model, and a feature-domain ensemble model;

determine that the output score generated based on the combined intermediate data satisfies a threshold; and in response to determining that the output score generated based on the combined intermediate data satisfies the threshold:

update parameters of at least one of the TSEM or the feature-domain ensemble model, wherein, when updating the parameters of at least one of the TSEM or the feature-domain ensemble model, the one or more instructions further direct the at least one processor to, for every time step less than a maximum time step:

determine a first variable based on the combined intermediate data and a current time step version of the TSEM;

determine a second variable based on a ratio of labels to the first variable;

backpropagate the feature-domain ensemble model based on a transpose of the combined intermediate data and the second variable; and determine a next time step version of the TSEM based on backpropagation of the feature-domain ensemble model and the current time step version of the TSEM.

10. The system of claim 9, wherein each anomaly detection model of the plurality of anomaly detection models comprises at least one of a classifier model or a score generation model.

11. The system of claim 9, wherein each anomaly detection model of the plurality of anomaly detection models comprises at least one of a Bayesian model, a Kullback-Leibler importance estimation procedure (KLIEP) model, a ChangeFinder model, or a cumulative sum (CUSUM) model.

12. The system of claim 9, wherein the one or more instructions further direct the at least one processor to:

determine whether to label or communicate the at least the portion of the multivariate sequence data based on the output score; and in response to determining whether to label or communicate the at least the portion of the multivariate sequence data, one of:

label the at least the portion of the multivariate sequence data based on the output score; or communicate the at least the portion of the multivariate sequence data and the output score to the user device.

13. The system of claim 9, wherein, when updating the parameters of at least one of the TSEM or the feature-domain ensemble model, the one or more instructions further direct the at least one processor to:

initialize the TSEM.

14. The system of claim 13, wherein, when updating the parameters of at least one of the TSEM or the feature-domain ensemble model, the one or more instructions further direct the at least one processor to:

for every time step less than the maximum time step:

determine a third variable based on a first Khatri-Rao product based on a current time step version of the time-domain ensemble model and a current time step version of the feature-domain ensemble model;

determine a current time step version of the model-domain ensemble model based on the third variable, the model-domain ensemble model, and a tensor unfolding in mode 0 of the TSEM;

determine a fourth variable based on a second Khatri-Rao product based on the current time step version of the model-domain ensemble model and the current time step version of the feature-domain ensemble model;

determine an updated current time step version of the time-domain ensemble model based on the fourth variable, the time-domain ensemble model, and a tensor unfolding in mode 1 of the TSEM;

determine a fifth variable based on a third Khatri-Rao product based on the current time step version of the model-domain ensemble model and the updated current time step version of the time-domain ensemble model; and determine an updated current time step version of the feature-domain ensemble model based on the fifth variable, the feature-domain ensemble model, and a tensor unfolding in mode 2 of the TSEM.

15. The system of claim 9, wherein a loss function of the TSEM is based on the model-domain ensemble model, the time-domain ensemble model, and the feature-domain ensemble model.

16. The system of claim 15, wherein the loss function of the TSEM is based on the following equation:

$$L(M, T, F) = \frac{1}{2}|H - MTF|^2 + \frac{\lambda_1}{2}(|M|^2 + |T|^2 + |F|^2) + \frac{\lambda_2}{2}|I - ZF|^2$$

wherein M is the model-domain ensemble model, T is the time-domain ensemble model, F is the feature-domain ensemble model, H is the TSEM, I is the feature importance vector, Z is the multivariate sequence data, $\lambda_1$ is a first coefficient, and $\lambda_2$ is a second coefficient.

17. A computer program product comprising at least one non-transitory computer-readable medium including one or more instructions that, when executed by at least one processor, cause the at least one processor to:

receive multivariate sequence data comprising a plurality of vectors, each vector of the plurality of vectors comprising elements based on a time sequence for a respective variable of a plurality of variables;

generate a plurality of scores comprising a respective score for each anomaly detection model based on inputting at least a portion of the multivariate sequence data into each anomaly detection model of a plurality of anomaly detection models;

combine the multivariate sequence data with the plurality of scores to generate combined intermediate data;

generate an output score based on inputting the combined intermediate data into a time-series sequences ensemble model (TSEM), the TSEM based on a model-domain ensemble model, a time-domain ensemble model, and a feature-domain ensemble model;

determine that the output score generated based on the combined intermediate data satisfies a threshold; and in response to determining that the output score generated based on the combined intermediate data satisfies the threshold:

update parameters of at least one of the TSEM or the feature-domain ensemble model, wherein, when updating the parameters of at least one of the TSEM or the feature-domain ensemble model, the one or more instructions further cause the at least one processor to, for every time step less than a maximum time step:

determine a first variable based on the combined intermediate data and a current time step version of the TSEM;

determine a second variable based on a ratio of labels to the first variable;

backpropagate the feature-domain ensemble model based on a transpose of the combined intermediate data and the second variable; and determine a next time step version of the TSEM based on backpropagation of the feature-domain ensemble model and the current time step version of the TSEM.

18. The computer program product of claim 17, wherein the one or more instructions further cause the at least one processor to:

determine whether to label or communicate the at least the portion of the multivariate sequence data based on the output score; and in response to determining whether to label or communicate the at least the portion of the multivariate sequence data, one of:

label the at least the portion of the multivariate sequence data based on the output score; or communicate the at least the portion of the multivariate sequence data and the output score to the user device.

19. The computer program product of claim 17, wherein, when updating the parameters of at least one of the TSEM or the feature-domain ensemble model, the one or more instructions further cause the at least one processor to:

initialize the TSEM.

20. The computer program product of claim 19, wherein, when updating the parameters of at least one of the TSEM or the feature-domain ensemble model, the one or more instructions further cause the at least one processor to:

for every time step less than the maximum time step:

determine a third variable based on a first Khatri-Rao product based on a current time step version of the time-domain ensemble model and a current time step version of the feature-domain ensemble model;

determine a current time step version of the model-domain ensemble model based on the third variable, the model-domain ensemble model, and a tensor unfolding in mode 0 of the TSEM;

determine a fourth variable based on a second Khatri-Rao product based on the current time step version of the model-domain ensemble model and the current time step version of the feature-domain ensemble model;

determine an updated current time step version of the time-domain ensemble model based on the fourth variable, the time-domain ensemble model, and a tensor unfolding in mode 1 of the TSEM;

determine a fifth variable based on a third Khatri-Rao product based on the current time step version of the model-domain ensemble model and the updated current time step version of the time-domain ensemble model; and determine an updated current time step version of the feature-domain ensemble model based on the fifth variable, the feature-domain ensemble model, and a tensor unfolding in mode 2 of the TSEM.

* * * * *